(12) United States Patent
Hirao et al.

(10) Patent No.: US 8,880,293 B2
(45) Date of Patent: Nov. 4, 2014

(54) VEHICLE MOTION CONTROL APPARATUS AND SUSPENSION CONTROL APPARATUS

(71) Applicant: Hitachi Automotive Systems, Ltd., Ibaraki (JP)

(72) Inventors: Ryusuke Hirao, Chiba (JP); Nobuyuki Ichimaru, Kanagawa (JP); Makoto Yamakado, Ibaraki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/624,191

(22) Filed: Sep. 21, 2012

(65) Prior Publication Data

US 2013/0079988 A1     Mar. 28, 2013

(30) Foreign Application Priority Data

Sep. 27, 2011  (JP) ................................. 2011-211288

(51) Int. Cl.
*B60W 10/22* (2006.01)
*B60W 10/184* (2012.01)
*B60W 30/02* (2012.01)
*B60W 30/045* (2012.01)

(52) U.S. Cl.
CPC ......... *B60W 10/184* (2013.01); *B60W 2520/14* (2013.01); *B60W 2520/125* (2013.01); *B60W 10/22* (2013.01); *B60W 2720/16* (2013.01); *B60W 2720/106* (2013.01); *B60W 2520/16* (2013.01); *B60W 2720/18* (2013.01); *B60W 2520/18* (2013.01); *B60W 30/045* (2013.01); *B60W 30/025* (2013.01)
USPC .............................................. 701/38; 701/41

(58) Field of Classification Search
CPC .. B60G 17/016; B60G 17/08; B60G 17/0195; B60G 1/016; F16G 9/50; F16F 9/44; F16F 9/46; G06G 7/76; G06F 7/00; B60T 7/42; B60T 8/267; B60T 8/1755; B62D 7/159; B62D 6/008

USPC .................. 701/1, 38, 41, 70, 78; 188/266.2; 303/10, 114.1; 280/5.507
See application file for complete search history.

(56) References Cited

U.S. PATENT DOCUMENTS 5,033,770 A * 7/1991 Kamimura et al. ........ 280/5.507
5,154,263 A * 10/1992 Lizell ......................... 188/266.2
(Continued)

FOREIGN PATENT DOCUMENTS

JP        2011-73534        4/2011

OTHER PUBLICATIONS

"Improvement of Roll Feeling Based on Visual Sensitivity" by Hideki Sakai et al., published in Toyota Technical Review vol. 55 No. 1 (Nov. 2006) pp. 20 to 24.

(Continued)

*Primary Examiner* — Tuan C. To
*Assistant Examiner* — Yuri Kan
(74) *Attorney, Agent, or Firm* — Wenderoth, Lind & Ponack, LLP

(57) ABSTRACT

A vehicle motion control apparatus configured to be used with a vehicle including a brake force control unit capable of generating a brake force during a steering operation. The control apparatus includes a plurality of force generation apparatuses disposed between a vehicle body of the vehicle and a plurality of axles, each of which is capable of generating an adjustable force between the vehicle body and each wheel of the vehicle, a force adjustment unit configured to adjust the force of each of the force generation apparatuses, and a target pitch state calculation unit configured to calculate a target pitch state from a state in which the vehicle body turns. The force adjustment unit adjusts the force of each of the force generation apparatuses so that a pitch state of the vehicle body approaches the target pitch state calculated by the target pitch state calculation unit.

20 Claims, 11 Drawing Sheets 6, 9, 16 Suspension control apparatus

(56) References Cited

U.S. PATENT DOCUMENTS

| | | | | |
|---|---|---|---|---|
| 6,064,930 | A * | 5/2000 | Shibahata | 701/36 |
| 6,415,215 | B1 * | 7/2002 | Nishizaki et al. | 701/70 |
| 2002/0147532 | A1 * | 10/2002 | Inagaki et al. | 701/41 |
| 2007/0124051 | A1 * | 5/2007 | Fujita | 701/70 |
| 2007/0188018 | A1 * | 8/2007 | Reuter et al. | 303/114.1 |
| 2009/0234537 | A1 * | 9/2009 | Tomida et al. | 701/38 |
| 2010/0030440 | A1 * | 2/2010 | Kosaka | 701/70 |
| 2011/0231033 | A1 * | 9/2011 | Yamakado et al. | 701/1 |

OTHER PUBLICATIONS

"A Study of Vehicle Roll Behavior (Japanese Title: Suspension Technology for Improvement of Roll Feeling)" by Kenji Kawagoe, published in Journal of Society of Automotive Engineers of Japan (Japanese Title: Automotive Technology) vol. 51 No. 11 (1997) pp. 20 to 24.

"Vehicle Attitude Measurement Method with GPS" by Hitoshi Fukuba et al., published in Matsuda Technical Review No. 20 (2002) pp. 130 to 138.

* cited by examiner

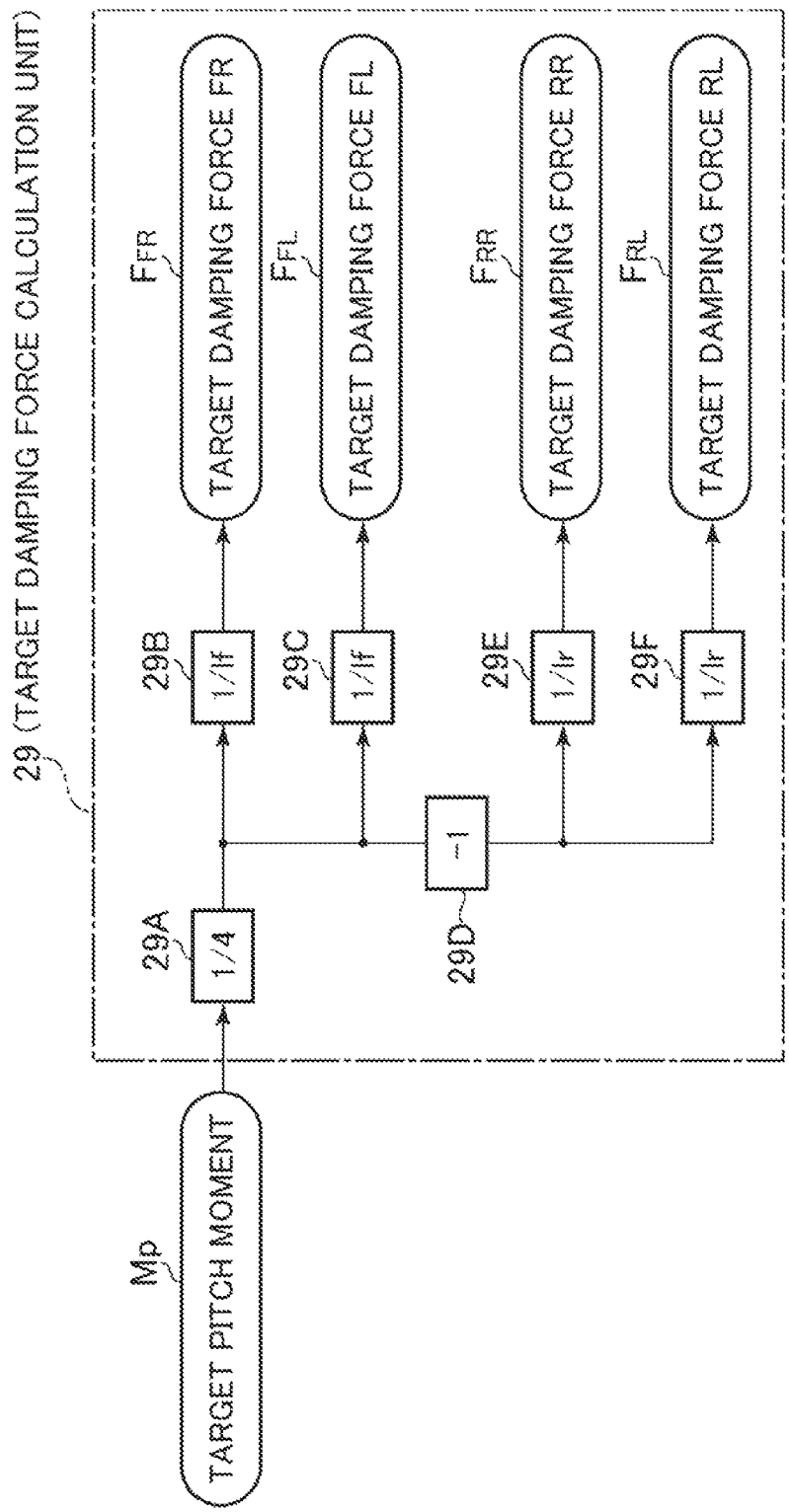

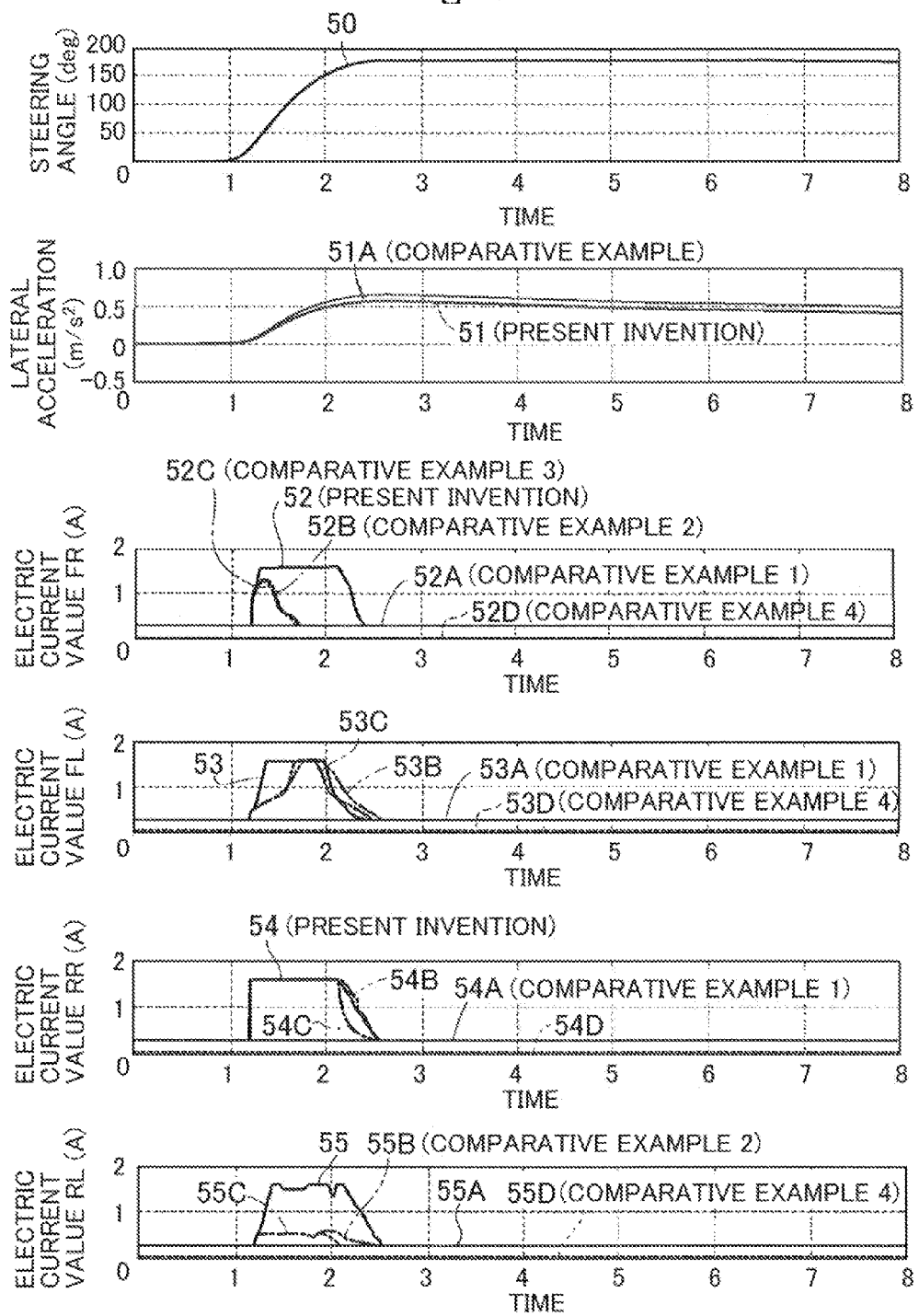

Fig. 5
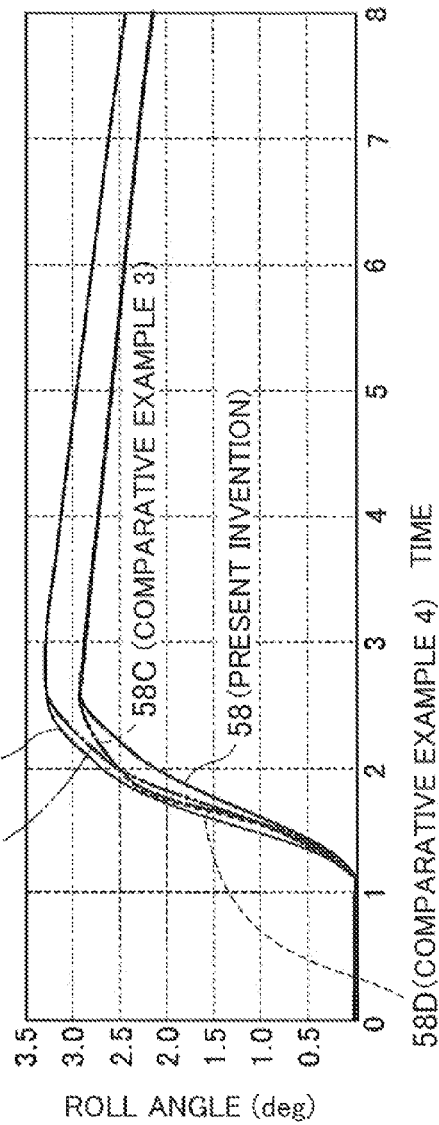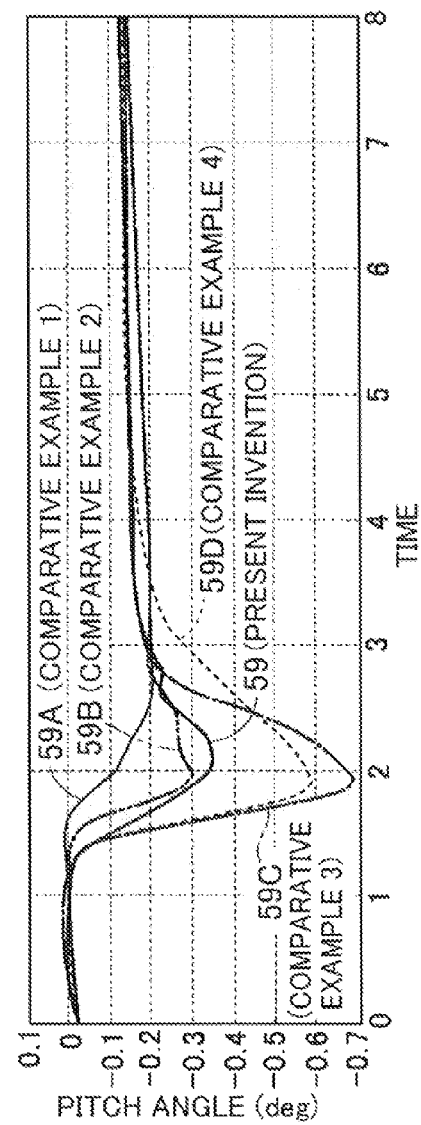

US 8,880,293 B2

VEHICLE MOTION CONTROL APPARATUS AND SUSPENSION CONTROL APPARATUS

TECHNICAL FIELD

The present invention relates to a vehicle motion control apparatus and a suspension control apparatus preferably usable with a vehicle such as a four-wheeled automobile.

BACKGROUND ART

Generally, there is known a vehicle motion control apparatus configured to calculate a lateral acceleration from a steering angle and speed of a vehicle, calculate a lateral jerk by differentiating the lateral acceleration, and then perform acceleration and deceleration control for each of front, rear, left, and right wheels according to this lateral jerk while performing skid prevention control for reducing a skid of the vehicle (for example, refer to Japanese Patent Application Public Disclosure No. 2011-073534).

On the other hand, a driver's feeling during a steering operation of a vehicle has been studied by various researches until now, as indicated in, for example, non-patent documents 1, 2, and 3 listed in "LIST OF NON-PATENT DOCUMENTS" which will be provided below. The non-patent document 1 focuses on the relationship between a roll angle and a pitch angle while the vehicle is running, and discusses that reducing a phase difference between a roll angle and a pitch angle can improve a driver's feeling such as a ride comfort and steering stability that the driver feels on the vehicle. The non-patent document 2 discusses that a driver can have a good feeling toward a roll behavior accompanied by head-down pitching when the driver operates the steering wheel. Further, the non-patent document 3 discusses that a driver can have a good feeling if the rotational axis hardly wobbles with a roll behavior and a pitch behavior of the vehicle in harmony with each other.

CITATION LIST

Non-Patent Documents

Non-patent Document 1: "Improvement of Roll Feeling Based on Visual Sensitivity" written by Hideki Sakai and 5 others, published in TOYOTA Technical Review Vol. 55 No. 1 (November, 2006) pages 20 to 24.

Non-patent Document 2: "A Study of Vehicle Roll Behavior (Suspension Technology for Improvement of Roll Feeling)" written by Kenji Kawagoe, published in Journal of Society of Automotive Engineers of Japan (Automotive Technology) Vol. 51 No. 11 (1997) pages 20 to 24

Non-patent Document 3: "Vehicle Attitude Measurement Method with GPS" written by Hitoshi Fukuba and 2 others, published in Matsuda Technical Review No. 20 (2002) pages 130 to 138.

The conventional technique discussed in the above-described patent document, Japanese Patent Application Public Disclosure No. 2011-073534, for example, calculates a lateral jerk generated at the vehicle during a steering operation, and performs acceleration and deceleration control for each wheel at the front, rear, left, and right wheel sides according to the lateral jerk. Therefore, an extra pitch motion may be generated, or, for example, a bump-steer phenomenon may occur. In this way, this technique still needs to be improved to refine the motion performance of the vehicle.

Further, the inventors of the present invention have considered a possibility of control focusing on improvement of a roll feeling during a steering operation and improvement of the stability in a critical region. However, this control may result in an increase in a roll rate due to harmonious control of a pitch motion and a roll motion, compared to control out of consideration of harmonious control of a pitch motion and a roll motion.

SUMMARY OF THE INVENTION

One aspect of the present invention is a vehicle motion control apparatus, which is configured to be used with a vehicle including a brake force control unit capable of generating a brake force during a steering operation of the vehicle, includes a plurality of force generation apparatuses disposed between a vehicle body of the vehicle and a plurality of axles, each of which is capable of generating an adjustable force between the vehicle body and each wheel of the vehicle, a force adjustment unit configured to adjust the force of each of the force generation apparatuses, and a target pitch state calculation unit configured to calculate a target pitch state from a state in which the vehicle body turns. The force adjustment unit adjusts the force of each of the force generation apparatuses so that a pitch state of the vehicle body approaches the target pitch state calculated by the target pitch state calculation unit.

Another aspect of the present invention is a vehicle motion control apparatus, which is configured to be used with a vehicle including a brake force control unit capable of generating a brake force at the vehicle when the vehicle turns to change a posture of a vehicle body in a pitch direction, includes a plurality of force generation apparatuses disposed between the vehicle body of the vehicle and a plurality of axles, each of which is capable of generating an adjustable force between the vehicle body and each wheel of the vehicle. The vehicle motion control apparatus calculates a target pitch state, and adjusts the forces generated by the brake force control unit and the force generation apparatuses so that a pitch state of the vehicle body approaches the target pitch state.

Still another aspect of the present invention is a suspension control apparatus, which is configured to be used with a vehicle including a brake force control unit capable of generating a brake force at the vehicle when the vehicle turns to change a posture of a vehicle body in a pitch direction, includes a plurality of force generation apparatuses disposed between the vehicle body of the vehicle and a plurality of axles, each of which is capable of generating an adjustable force between the vehicle body and each wheel of the vehicle. The suspension apparatus calculates a target pitch state, and adjusts the force generated by each of the force generation apparatuses so that a pitch state of the vehicle body approaches the target pitch state, when the brake force control unit changes the posture in the pitch direction while the vehicle is turning.

BRIEF DESCRIPTION OF THE DRAWINGS

FIG. 3 is a control block diagram illustrating processing by a target damping force calculation unit illustrated in FIG. 2 for calculating a target damping force at each wheel from a target pitch moment;

FIG. 4A illustrates simulation results respectively indicating a steering angle, a lateral acceleration and a damping force control current at each wheel.

FIG. 5 illustrates simulation results respectively indicating a roll angle and a pitch angle during the steering operation of the vehicle;

DETAILED DESCRIPTION OF THE INVENTION

Hereinafter, a vehicle motion control apparatus according to embodiments of the present invention will be described in detail with reference to the accompanying drawings, based on an example in which this vehicle motion control apparatus is used with, for example, a four-wheeled automobile.

Figure 1:
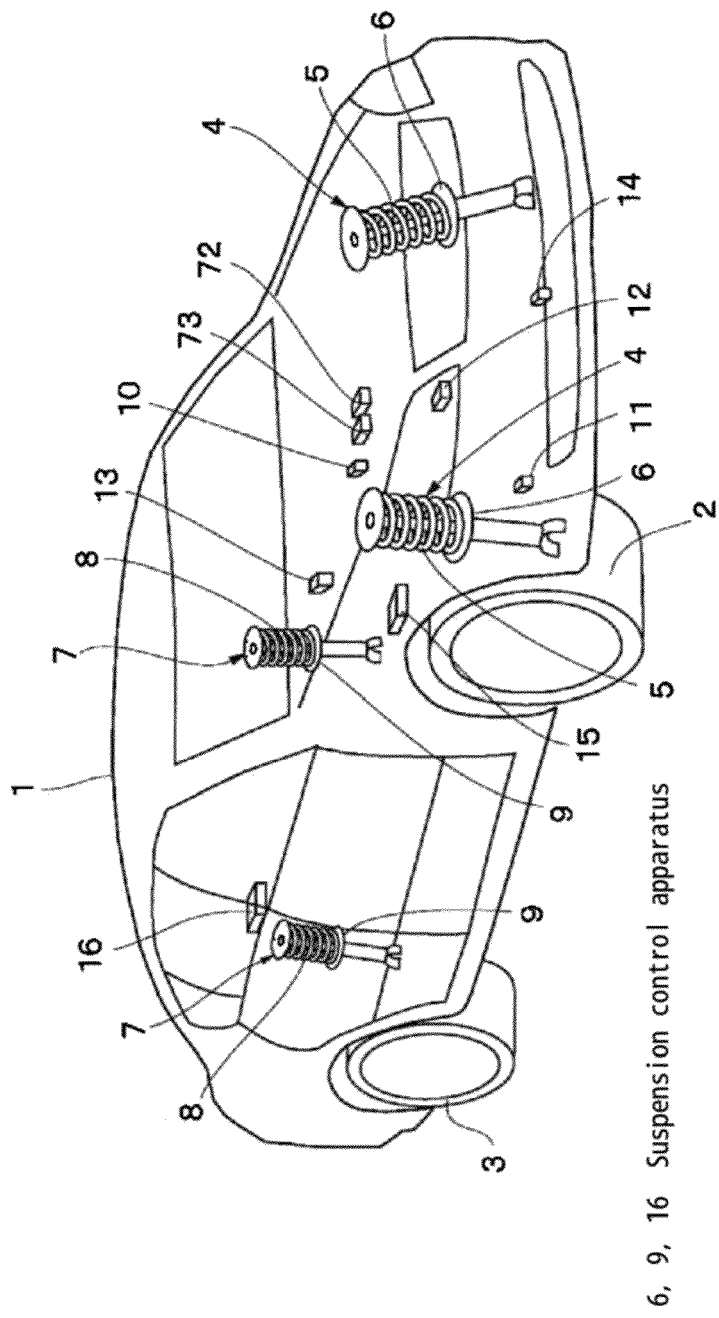
FIG. 1 is a perspective view illustrating a four-wheeled automobile employing a vehicle motion control apparatus according to first and second embodiments of the present invention.

FIGS. 1 to 7 illustrate a first embodiment of the present invention. In FIG. 1, reference numeral 1 denotes a vehicle body that constitutes a main structure of a vehicle. For example, front left and right wheels 2, and rear left and right wheels 3 are disposed below the vehicle body 1 (FIG. 1 illustrates only the front right wheel 2 and the rear right wheel 3).

Reference numeral 4 denotes suspension apparatuses at front wheel side, which are interposed between an axle or axles connected with the front left and right wheels 2 and the vehicle body 1. Each of the suspension apparatuses 4 includes a left or right suspension spring 5 (hereinafter referred to as "the spring 5"), and a left or right damping force adjustable shock absorber 6 (hereinafter referred to as "the damping force variable damper 6") disposed between an axle connected with the front left and/or right wheel 2 and the vehicle body 1 in parallel with the spring 5. The damping force variable damper 6 constitutes a part of a force generation apparatus (more specifically, a pitch moment generation unit and a roll suppression unit), which is a component of the present invention.

The present embodiment will be described based on an example using a damping force adjustable shock absorber as the force generation apparatus. However, the present invention can be carried out even by using a cylinder apparatus disposed between an axle and the vehicle body, such as a known air suspension, hydraulic active suspension, and hydraulic stabilizer apparatus. Further, the present invention can be carried out by even using an electromagnetic suspension apparatus or an electromagnetic stabilizer including a direct driven-type linear motor or rotary motor disposed between the vehicle body and an axle. In sum, the force generation apparatus in the present invention may be embodied by any type of apparatus capable of directly providing a force between an axle and the vehicle body. The suspension control apparatus according to the present invention is constituted by this force generation apparatus and a controller 16, which will be described below.

Reference numeral 7 denotes suspension apparatuses at the rear wheel side, which are interposed between an axle or axles connected with the rear left and right wheels 3 and the vehicle body 1. Each of the suspension apparatuses 7 includes a left or right suspension spring 8 (hereinafter referred to as "the spring 8"), and a left or right damping force adjustable shock absorber 9 (hereinafter referred to as "the damping force variable damper 9") disposed between an axle connected with the rear left and/or right wheel 3 and the vehicle body 1 in parallel with the spring 8. The damping force variable damper 9 constitutes a part of the force generation apparatus (more specifically, the pitch moment generation unit and the roll suppression unit), which is an essential component of the present invention.

Each of the damping force variable dampers 6 and 9 of the respective suspension apparatuses 4 and 7 is constituted by a hydraulic shock absorber capable of adjusting the damping force thereof. This damping force variable damper 6 or 9 includes an actuator (not illustrated) constituted by, for example, a damping force adjustable valve and a solenoid so as to be able to continuously adjust the damping force characteristic thereof from the hard characteristic to the soft characteristic. The actuator for adjusting the damping force does not necessarily have to be configured to continuously change the damping force characteristic, and may be configured to adjust the damping force in a stepwise manner through two, three, or more steps. Further, the damping force variable damper 6 or 9 may be embodied by any damper capable of switching the damping force such as a pneumatic damper or an electromagnetic damper.

Reference numeral 10 denotes a roll rate sensor constituted by, for example, a gyroscope as a roll rate detection unit disposed at the vehicle body 1. This roll rate sensor 10 detects a lateral shake in the left-right direction, which may be generated according to, for example, a steering operation of the vehicle when the vehicle is running around a corner, and outputs the detection signal to the controller 16, which will be described below. The roll rate detection unit may be configured in any manner capable of detecting a lateral shake of the vehicle (a roll angle or a roll rate). For example, the roll rate detection unit may be configured to integrate a difference between values detected at two vertical acceleration sensors disposed in a laterally spaced-apart relationship.

Reference numeral 11 denotes a pitch rate sensor constituted by, for example, a gyroscope as a pitch rate detection unit disposed at the vehicle body 1. The pitch rate sensor 11 detects a longitudinal shake in the front-rear direction, which may be generated, for example, when the vehicle is accelerated or decelerated, and outputs the detection signal to the controller 16, which will be describe below. The pitch rate detection unit may be configured in any manner capable of detecting a pitch rate. For example, the pitch rate detection unit may be configured to calculate a pitch rate by integrating a difference between values detected at two vertical acceleration sensors disposed in a longitudinally spaced-apart relationship, or may be configured to calculate a pitch rate from a change in the rotational speed of the wheel.

Reference numeral 12 denotes a yaw rate sensor constituted by, for example, a gyroscope as a yaw rate detection unit disposed at the vehicle body 1. The yaw rate sensor 12 detects, for example, a shake in the rotational direction which may be generated around the center of gravity of the vehicle, and outputs the detection signal to the controller 16, which will be described below. A single three-dimensional gyroscope may be used as all of the above-described roll rate sensor 10, the pitch rate sensor 11, and the yaw rate sensor 12, or may be used as at least two of the three sensors.

Reference numeral 13 denotes a steering angle sensor disposed at the vehicle body 1. The steering angle sensor 13 detects a steering angle (corresponds to a front wheel steering angle $\delta_f$, which will be described below) when a driver of the vehicle operates a steering wheel, for example, while running around a corner, and outputs the detection signal to the controller 16, which will be described below. Further, a vehicle speed sensor 14 detects, for example, a running speed of the vehicle (corresponds to a vehicle speed V, which will be described below), and outputs the detection signal to the controller 16.

Reference numeral 15 denotes a brake hydraulic pressure control apparatus mounted on the vehicle body 1. The brake hydraulic pressure control apparatus 15 constitutes a brake force control unit, together with, for example, a GVC control unit 41 and a target hydraulic pressure calculation unit 47, which will be described below. The brake hydraulic pressure control apparatus 15 generates a brake hydraulic pressure according to an operation of a brake pedal by a driver of the vehicle and a control signal (a brake signal) output from the controller 16, which will be described below, and controls the brake hydraulic pressure to be increased, maintained or reduced. Each of wheel cylinders (all of them are not illustrated), which are constituted by, for example, disk brakes at the front and rear wheels 2 and 3, applies a brake force to the corresponding wheel (the corresponding wheel among the front and rear wheels 2 and 3) in response to a supply of the brake hydraulic pressure variably controlled by the brake hydraulic pressure control apparatus 15, thereby performing deceleration control for each wheel. The present embodiment is described based on an example using a brake apparatus that generates a brake force by a hydraulic pressure. However, the brake apparatus may generate a brake force by an electric motor, and in this case, the brake hydraulic pressure control apparatus 15 is replaced with a brake force control apparatus that calculates a control electric current.

Figure 2:
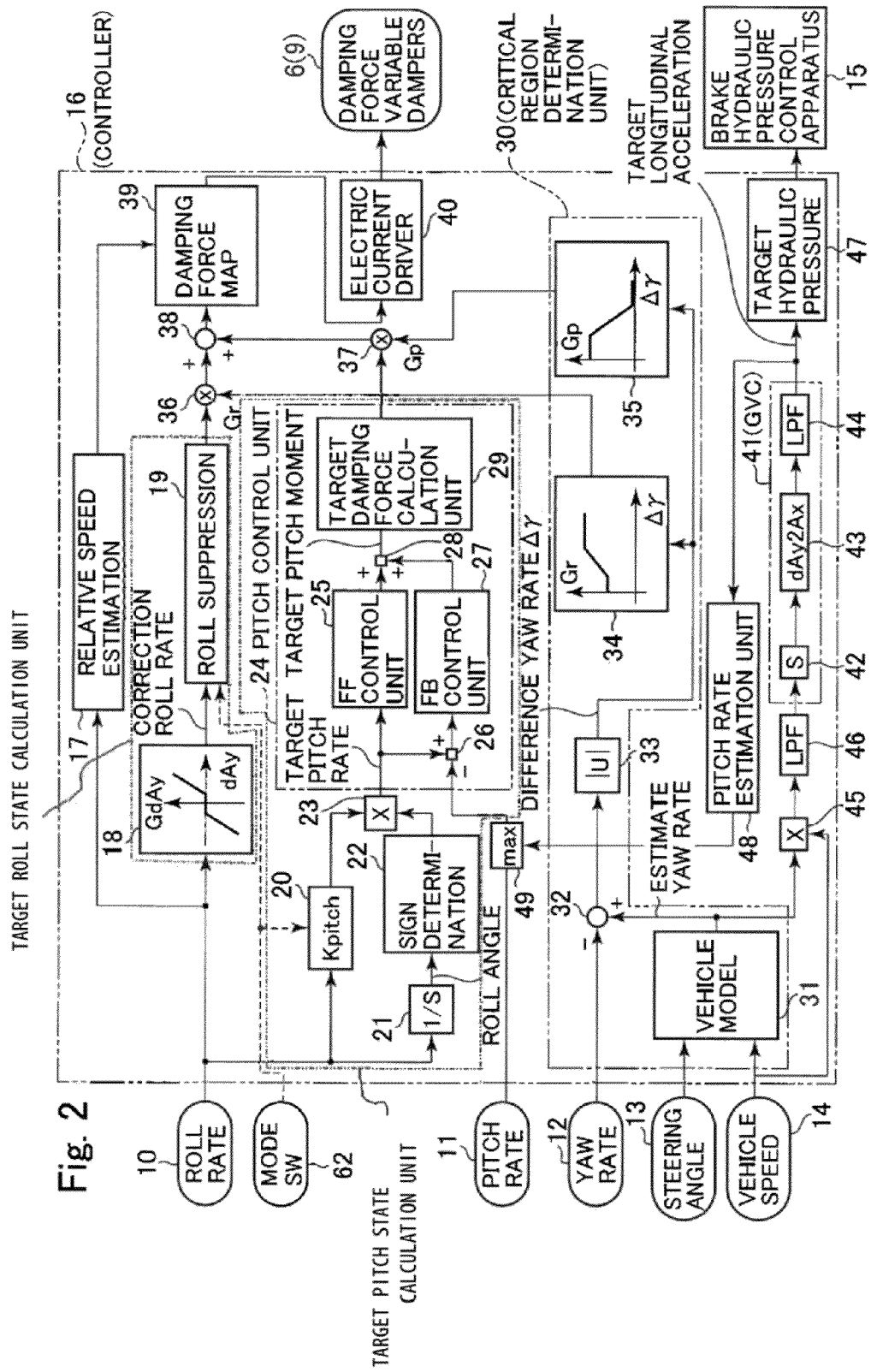
FIG. 2 is a control block diagram illustrating the vehicle motion control apparatus according to the first embodiment.

Reference numeral 16 denotes a controller as a control unit constituted by, for example, a microcomputer. As illustrated in FIG. 2, the input side of the controller 16 is connected to, for example, the roll rate sensor 10, the pitch rate sensor 11, the yaw rate sensor 12, the steering angle sensor 13, and the vehicle speed sensor 14. The output side of the controller 16 is connected to, for example, the actuators (not illustrated) of the damping force variable dampers 6 and 9, and the brake hydraulic pressure control apparatus 15.

As illustrated in FIG. 2, the controller 16 includes, for example, a relative speed estimation unit 17, a roll rate correction unit 18, a roll suppression unit 19, a gain multiplication unit 20, an integration unit 21, a sign determination unit 22, a multiplication unit 23, a pitch control unit 24, a critical region determination unit 30, first and second weight coefficient multiplication units 36 and 37, an addition unit 38, a damping force map calculation unit 39, an electric current driver 40, the GVC control unit 41, a target hydraulic pressure calculation unit 47, a pitch rate estimation unit 48, and a maximum value selection unit 49.

The relative speed estimation unit 17 of the controller 16 calculates a vertical extension/compression speed of the damping force variable damper 6 or 9 at each wheel as a relative speed, by estimation calculation based on the detection signal from the roll rate sensor 10. Further, the roll rate correction unit 18 calculates a corrected roll rate (GdAy) from the roll rate detected by the roll rate sensor 10 by referring to a non-linear gain map illustrated in FIG. 2. This corrected roll rate (GdAv) is set to a larger value according to the non-linear gain map illustrated in FIG. 2, as the detection value (dAv) of the roll rate increases.

The roll rate correction unit 18 constitutes a target roll state calculation unit that calculates a target roll state from a cornering state of the vehicle body 1, together with the roll suppression unit 19, which will be described below. In this case, the term "roll state" is defined to refer to a state of a roll angle or a roll rate. The roll suppression unit 19 multiplies the corrected roll rate (GdAy) output from the roll rate correction unit 18 by a gain (not illustrated), to calculate a target damping force for the damping force variable damper 6 or 9 at each wheel to perform roll suppression control.

Further, the pitch control unit 24 of the controller 16 performs pitch control to improve the roll feeling, and therefore the gain multiplication unit 20 multiplies the roll rate (for example, a right-hand rotation is detected as a positive value) detected by the roll rate sensor 10 by a gain "Kptich". The sign determination unit 22 determines the sign of the roll angle that the integration unit 21 calculates by integrating the roll rate (for example, determines a right-hand roll as a positive value and a left-hand roll as a negative value). The multiplication unit 23 multiplies the roll rate from the gain multiplication unit 20 by that sign to calculate a target pitch rate as a corrected value in such a manner that the vehicle is constantly in a dive state (a pitch state with the head low) when a roll state increases or in a squat state (a pitch state with the head high) when a roll state decreases.

The gain multiplication unit 20, the integration unit 21, the sign determination unit 22, and the multiplication unit 23 constitute a part of the target pitch state calculation unit (target pitch rate calculation unit), which is a component of the present invention. As a result, the target pitch rate, which is a target value of the pitch rate of the vehicle body 1, is calculated as a corrected value so as to increase linearly or non-linearly according to the value of the roll rate of the vehicle body 1.

The pitch control unit 24 includes an FF control unit 25, a difference calculation unit 26, an FB control unit 27, an addition unit 28, and a target damping force calculation unit 29. The pitch control unit 24 constitutes the target pitch state calculation unit, which is a component of the present invention. When the corrected value of the target pitch rate is input into the FF control unit 25, the FF control unit 25 calculates a target pitch moment by feed forward control according to the following equations 1 to 3. In this case, the term "pitch state" is defined to refer to a state of a pitch rate or a pitch angle.

The difference calculation unit 26 calculates a difference between the pitch rate signal (i.e., a larger one of a signal of actual pitch rate detected by the pitch rate sensor 11, and a signal of pitch rate estimation value estimated and calculated by the pitch rate estimation unit 48, which will be described below) output from the maximum value selection unit 49, which will be described below, and the corrected value of the target pitch rate as a deviation from a target value.

The FB control unit 27, which is the subsequent stage, calculates a target pitch moment by feedback control according to the signal (a deviation from the target value) from the difference calculation unit 26. The FF control unit 25 is a controller generated by formulating a model of the characteristic from a pitch moment to a pitch rate as a quadratic vibration model, calculating a transfer function thereof, and utilizing an inverse characteristic (inverse transfer function) thereof. A motion equation of a pitch motion can be calculated as the following equation 1. In this equation, Q represents a pitch angle, $I_x$ represents a pitch inertial, $K_x$ represents a pitch rigidity, $C_x$ represents a pitch damping coefficient, and $M_x$ represents a pitch moment.

$$I_x \times \ddot{Q} = -K_x \times Q - C_x \times \dot{Q} + M_x \qquad \text{[EQUATION 1]}$$

From this equation 1, the transfer function from a pitch moment to a pitch rate can be expressed as the following equation 2, according to which, the following equation 3 can be acquired as the transfer function from a pitch rate to a pitch moment.

$$\frac{\dot{Q}}{M_x} = \frac{s}{I_x \times s^2 + C_x \times s + K_x} \qquad \text{[EQUATION 2]}$$

$$\frac{M_x}{\dot{Q}} = \frac{I_x \times s^2 + C_x \times s + K_x}{s} \qquad \text{[EQUATION 3]}$$

The FB control unit 27 may be a PID controller configured to output a target pitch moment according to the above-described deviation, or may be configured using, for example, a modern control theory. The FB control unit 27 is not especially limited by a control law. The pitch control unit 24 calculates a difference between the corrected value of target pitch rate and the above-described pitch rate signal as a deviation from the target value by the difference calculation unit 26 as described above. The addition unit 28 adds the target pitch moments respectively calculated by the FF control unit 25 and the FB control unit 27, and outputs this value to the target damping force calculation unit 29 as a target pitch moment.

In other word, the addition unit 28 of the pitch control unit 24 adds the target pitch moment calculated by the FF control unit 25 and the target pitch moment calculated by the FB control unit 27, and outputs this value to the target damping force calculation unit 29, which corresponds to a subsequent stage, as a target pitch moment $M_p$. This target pitch moment is input to the target damping force calculation unit 29 of the pitch control unit 24. In response to this input, the target damping force calculation unit 29 calculates a target damping force by pitch control to improve the roll feeing at the vehicle body 1.

As illustrated in FIG. 3, in response to an input of the target pitch moment $M_p$, the target damping force calculation unit 29 calculates the target damping force so as to distribute the target damping force to the respective wheels (i.e., the front left and right wheels 2, and the rear left and right wheels 3) according to the target pitch moment $M_p$. In other words, a block 29A of the target damping force calculation unit 29 divides the target pitch moment $M_p$ in quarters, and equally distribute them to the respective wheels. The subsequent block, a block 29B calculates a target damping force $F_{FR}$ of the front right wheel 2 by dividing the equally distributed moment ($M_p/4$) by a distance lf from the front right wheel to the center of gravity at the front wheels 2. A block 29C calculates a target damping force $F_{FL}$ of the front left wheel 2 by dividing the equally distributed moment ($M_p/4$) by the distance lf from the front left wheel to the center of gravity at the front wheels 2.

On the other hand, a block 29D of the target damping force calculation unit 29 multiplies the moment Mp/4 by "−1" so that the front wheels 2 and the rear wheels 3 have the target damping forces set in the opposite directions to each other. The subsequent block, a block 29E calculates a target damping force $F_{RR}$ of the rear right wheel 3 by dividing the equally distributed moment (Mp/4) by a distance lr from the rear right wheel to the center of gravity at the rear wheels 3. A block 29F calculates a target damping force $F_{RL}$ of the rear left wheel 3 by dividing the equally distributed moment (Mp/4) by the distance lr from the rear left wheel to the center of gravity at the rear wheels 3.

Next, the critical region determination unit 30 will be described. The critical region determination unit 30 determines whether the state about how the tire grippes the road surface while the vehicle is running (the state of the vehicle) reaches the critical region (non-linear operation) from a normal operation region (linear operation). The critical region determination unit 30 includes a vehicle model unit 31, a difference calculation unit 32, an absolute value calculation unit 33, and first and second yaw rate map calculation units 34 and 35. The critical region determination unit 30 constitutes a vehicle motion determination unit. As will be used herein, the term "normal operation region (linear region)" and the term "critical region (non-linear region)" respectively mean "a region where the frictional force linearly increases according to an increase in the load" and "a region where an increase in the frictional force is saturated relative to an increase in the load" in the relationship between the state about how the tire grippes the road surface (the frictional force) and the load while the vehicle is running.

In this case, the vehicle model unit 31 of the critical region determination unit 30 estimates and calculates a yaw rate γ of a linear vehicle model expressed by the following equation 4, based on a signal of steering angle (a front wheel steering angle δf) detected by the steering angle sensor 13 and a signal of the vehicle speed V detected by the vehicle speed sensor 14. In this equation, V represents the vehicle speed (m/s), A represents a stability factor ($S^2/m^2$), and δf represents the front wheel steering angle (rad), and L represents a wheel base (m).

$$\gamma = \frac{1}{1 + A \times V^2} \times \frac{V}{L} \times \delta_f \qquad \text{[EQUATION 4]}$$

The deference calculation unit 32 calculates a difference between an actual yaw rate actually detected by the yaw rate sensor 12, and the yaw rate γ estimated and calculated by the vehicle model unit 31. The absolute value calculation unit 33 calculates an absolute value of the calculated difference as a difference yaw rate Δγ. The first yaw rate map calculation unit 34 calculates a first yaw rate weight coefficient Gr based on the difference yaw rate Δγ with use of a map. As illustrated in FIG. 2, the first yaw rate weight coefficient Gr is set to, for example, a value smaller than "1" when the difference yaw rate Δγ is small, and the first yaw rate weight coefficient Gr gradually increases to be set to, for example, "1" or a value larger than "1", as the difference yaw rate Δγ increases.

The second yaw rate map calculation unit 35 calculates a second yaw rate weight coefficient Gp based on the difference yaw rate Δγ with use of a map. As illustrated in FIG. 2, the second yaw rate weight coefficient Gp is set to, for example, "1" or a value larger than "1" when the difference yaw rate Δγ is small, and the second yaw rate weight coefficient Gp gradually reduces to be set to, for example, "0" or a value close to "0" as the difference yaw rate Δγ increases. In other words, when the first yaw rate weight coefficient Gr gradually increases, the second yaw rate weight coefficient Gp gradually reduces to be set to a value close to "0" in an opposite manner to the first yaw rate weight coefficient Gr. When the first yaw rate weight coefficient Gr gradually reduces, the second yaw rate weight coefficient Gp is set to, for example, "1" or a value larger than "1" in an opposite manner to the first yaw rate weight coefficient Gr.

In this way, the critical region determination unit 30 determines that the tire while the vehicle is running approaches the non-linear region, i.e., the critical region, from the normal operation region (the linear region), when a large value is acquired as the difference yaw rate Δγ, which is a difference between the yaw rate γ estimated and calculated by the vehicle model unit 31 and the actual yaw rate. In this case, the first yaw rate weight coefficient Gr is set to a large value so as to add a weight to the control at the roll suppression unit 19, while the second yaw rate weight coefficient Gp is set to a small value such as "0" or a value close to "0" to relatively reduce the control at the pitch control unit 24.

The first weight coefficient multiplication unit 36 multiplies the target damping force for performing the roll suppression control (the stability improvement control), which is output from the roll suppression unit 19 to the damping force variable damper 6 or 9 at each wheel, by the first yaw rate weight coefficient Gr, thereby adding a weight to the target damping force for stability improvement. The second weight coefficient multiplication unit 37 multiplies the target damping force for performing the pitch control (the roll feeling improvement control), which is output from the pitch control unit 24 to the damping force variable damper 6 or 9 at each wheel, by the second yaw rate weight coefficient Gp, thereby adding a weight to the target damping force for roll feeing improvement.

In this way, the critical region determination unit 30, which constitutes the vehicle motion determination unit, calculates the difference between the yaw rate estimated by the vehicle model unit 31 and the actual yaw rate detected by the yaw rate sensor 12 as the difference yaw rate Δγ, and inputs this difference yaw rate Δγ to the first and second yaw rate map calculation units 34 and 35, which calculate a weight of each control, to acquire the first and second yaw rate weight coefficients Gr and Gp. The first weight coefficient multiplication unit 36 multiplies the target damping force calculated by the roll control unit 19 by the first yaw rate weight coefficient Gr to calculate a first target damping force corrected according to the state about how the tire grippes the road surface while the vehicle is running (for example, when the tire reaches the critical region). The second weight coefficient multiplication unit 37 multiplies the target damping force calculated by the pitch control unit 24 by the second yaw rate weight coefficient Gp to calculate a second target damping force, which is also corrected according to the state about how the tire grippes the road surface while the vehicle is running (for example, when the tire reaches the critical region). As a result, it becomes possible to change or adjust the control ratio of the first target damping force (the stability improvement control) and the second target damping force (the roll feeling improvement control).

The addition unit 38 adds the target damping forces that the first and second weight coefficient multiplication units 36 and 37 weight and correct in consideration of, for example, the critical region of the tire as described above, respectively, and outputs the added target damping force to the damping force map calculation unit 39 as a final target damping force. The damping force map calculation unit 39 calculates an instruction value of control electric current from the characteristic map of the damper stored in advance, according to the thus-calculated target damping force and the relative speed of each damping force variable damper 6 or 9, which is estimated by the relative speed estimation unit 17.

Next, the electric current driver 40 controls an electric current value, which corresponds to the target damping force and should be output to the actuator of the damping force variable damper 6 or 9, based on the instruction value of electric current output from the damping force map calculation unit 39. The damping force variable damper 6 or 9 at each of the wheels (the front left and right wheels 2 and the rear left and light wheels 3) is controlled in such a manner that the damping force characteristic thereof varies between the hard characteristic and the soft characteristic continuously or in a stepwise manner according to the electric current value (the electric current instruction value) supplied to the actuator. The electric current driver 40 constitutes a force adjusting unit, which is a component of the present invention, together with, for example, the damping force map calculation unit 39.

Next, a brake force control unit will be described. The brake force control unit calculates a target hydraulic pressure that should be output to the brake hydraulic pressure control apparatus 15 by G-Vectoring control (hereinafter referred to as "GVC control unit 41"). The GVC control unit 41 includes a differential unit 42, a gain multiplication unit 43, and a filter unit 44. A lateral acceleration calculation unit 45 and a preceding stage filter unit 46 are disposed in the preceding stages of the GVC control unit 41.

The lateral acceleration calculation unit 45 estimates and calculates a lateral acceleration Ay together with the vehicle model unit 31 based on the signal of steering angle detected by the steering angle sensor 13 and the signal of vehicle speed detected by the vehicle speed sensor 14 in the following manner. This lateral acceleration Ay can be expressed by the following equation 5, assuming that the vehicle has a linear model and ignoring the dynamic characteristic of the vehicle. In this equation, V represents the vehicle speed (m/s), A represents the stability factor ($S^2/m^2$), δf represents the front wheel steering angle (rad), and L represents the wheel base (m).

$$Ay = \frac{1}{1 + A \times V^2} \times \frac{V^2}{L} \times \delta_f \qquad \text{[EQUATION 5]}$$

The preceding stage filter unit 46 performs filtering processing for reproducing the dynamic characteristic on the thus-calculated lateral acceleration Ay. More specifically, a signal output from the vehicle model unit 31 is a signal calculated ignoring the dynamic characteristic from a steering operation of the steering wheel to generation of a roll motion of the vehicle body 1. Therefore, the preceding stage filter unit 46 reproduces the dynamics by a low-pass filter "LPF" approximately representing the dynamic characteristic in this case.

The differential unit 42 of the GVC control unit 41 differentiates the lateral acceleration Ay as an estimated value output from the lateral acceleration calculation unit 45 via the preceding stage filter unit 46 to calculate a lateral jerk. The gain multiplication unit 43 multiplies the calculated lateral jerk by a gain "dAy2Ax". The filter unit 44, which is the subsequent stage, performs filtering processing with use of the low-pass filter "LPF", thereby acquiring a target longitudinal acceleration.

Next, the target hydraulic pressure calculation unit 47 calculates a target hydraulic pressure value based on the target longitudinal acceleration output from the GVC control unit 41, and causes the brake hydraulic pressure control apparatus 15 to generate a hydraulic pressure corresponding to this hydraulic pressure value. The brake force control unit, which is constituted by, for example, the GVC control unit 41 and the target hydraulic pressure calculation unit 47, can realize the GVC control for harmoniously controlling the lateral acceleration and the longitudinal acceleration by calculating a target hydraulic pressure that should be output to the brake hydraulic pressure control apparatus 15 as described above.

On the other hand, the pitch rate estimation unit 48 estimates a pitch rate generated at the vehicle body 1 according to the target longitudinal acceleration output from the GVC control unit 41. Next, the maximum value selection unit 49 selects a larger one from the pitch rate estimated value estimated by the pitch rate estimation unit 48 and a signal value of the actual pitch rate detected by the pitch rate sensor 11 as a maximum value, and outputs this maximum value to the pitch control unit 24. Therefore, the pitch control unit 24 can calculate the target damping force by the pitch control for improving the roll feeling based on the above-described maximum value and the target pitch rate.

The vehicle motion control apparatus according to the present embodiment is configured in this way. Next, processing for controlling a posture of the vehicle body 1 by the controller 16 will be described.

First, at the GVC control unit 41, the differential unit 42 calculates a lateral jerk by differentiating an estimated lateral acceleration, which is calculated by the preceding stage filter unit 46 with use of the LPF (low-pass filter) to take the vehicle model and the vehicle dynamics into consideration. Then, the gain multiplication unit 43 multiplies the lateral jerk by the gain, and the filter unit 44 performs the LPF processing, thereby calculating a target longitudinal acceleration. The target hydraulic pressure calculation unit 47 calculates a target hydraulic pressure from the target longitudinal acceleration calculated by the GVC control unit 41, and causes the brake hydraulic pressure control apparatus 15 to generate a hydraulic pressure at the wheel cylinder (disk brake) at each wheel. This control can realize the GVC control for harmoniously controlling the lateral acceleration and the longitudinal acceleration.

Next, the roll suppression control will be described. A vehicle stability improvement control unit is constituted by the damping force variable damper 6 or 9 at each of the wheels (the front left and right wheels 2 and the rear left and right wheels 3), the roll rate correction unit 18, the roll suppression unit 19, the first weight coefficient multiplication unit 36, the addition unit 38, the damping force map calculation unit 39, and the electric current driver 40 in the controller 16. In the vehicle stability improvement control unit, the roll rate correction unit 18 calculates a corrected roll rate from the roll rate detected by the roll rate sensor 10. The roll suppression unit 19 calculates a target damping force at the damping force variable damper 6 or 9 at each wheel based on the corrected roll rate for performing the roll reduction control.

Further, the target pitch rate calculation unit, which comprises the gain multiplication unit 20, the integration unit 21, the sign determination unit 22, and the multiplication unit 23 in the controller 16, calculates a target pitch rate as a target value of pitch rate of the vehicle body 1 so that the target pitch rate linearly or non-linearly increases according to the value of the roll rate of the vehicle body 1. The pitch control unit 24 calculates a target damping force by the pitch control to improve the roll feeing at the vehicle body 1. As a result, the damping force characteristic of the damping force variable damper 6 or 9 disposed at each of the wheels (the front left and right wheels 2 and the rear left and light wheels 3) is variably controlled so as to achieve the target pitch rate, thereby controlling the vehicle body 1 to generate a pitch moment for improving the roll feeling.

In this case, the maximum value selection unit 49 selects a larger one of the estimated value of pitch rate output from the pitch rate estimation unit 48 and the signal value of actual pitch rate detected by the pitch rate sensor 11 as a maximum value, and output this maximum value to the difference calculation unit 26 of the pitch control unit 24 as a pitch rate signal. Therefore, the pitch control unit 24 can calculate a target damping force by the pitch control for improving the roll feeing based on the maximum value and the target pitch rate.

Normally, the pitch rate generated by the GVC control unit 41 at the vehicle body 1 is larger than the target pitch rate. Therefore, the damping force characteristic of the damping force variable damper 6 or 9 at each wheel is controlled in consideration of the pitch generated by the GVC control unit 41 at the vehicle body 1 via, for example, the maximum value selection unit 49 and the pitch control unit 24 as described above, whereby a signal of target damping force at each of the wheels (i.e., the front left and right wheels 2 and the rear left and right wheels 3), which is output from the pitch control unit 24, can function as a control signal for pitch suppression, and work to increase the damping force at the front wheel positioned at the outer side of the vehicle body 1 while the vehicle is turning a corner, and the rear wheel positioned at the inner side of the vehicle body 1 while the vehicle is turning a corner, which wheels have a small damping force to obtain a roll motion with the head of the vehicle body 1 low.

In other words, the present embodiment estimates a pith state to be generated by the GVC control unit 41 at the vehicle body 1, and compares the estimated value with the target pitch rate calculated from the roll rate. If the pitch rate to be generated by the GVC control unit 41 is larger, the present embodiment controls the vehicle to reduce the pitch motion. As a result, the present embodiment can set the strong damping force at each wheel, and reduce a roll behavior by a steering operation and a pitch behavior by the GVC control. In this way, the present embodiment can prevent a head-down pitch motion more than necessary and solve a lack of suppression of a roll motion by performing roll control harmonious with the GVC control. As a result, the present embodiment allows a roll motion and a pitch motion to be actively reduced, thereby improving the stability of the vehicle.

On the other hand, the critical region determination unit 30 performs control of calculating a difference between the yaw rate estimated by the vehicle model unit 31 and the actual yaw rate as the difference yaw rate $\Delta\gamma$, and determining the critical state of the vehicle by the difference yaw rate $\Delta\gamma$. More specifically, the critical region determination unit 30 calculates the first and second yaw rate weight coefficient Gr and Gp by inputting the difference yaw rate $\Delta\gamma$ to the first and second yaw rate map calculation units 34 and 35. The first weight coefficient multiplication unit 36 multiplies the target damping force calculated by the roll suppression unit 19 by the first yaw rate weight coefficient Gr, and calculates the first target damping force corrected according to the state about how the tire grips the road surface (for example, whether the tire reaches the critical region). Further, the second weight coefficient multiplication unit 37 multiplies the target damping force calculated by the pitch control unit 24 by the second yaw rate weight coefficient Gp, and calculates the second target damping force corrected according to the state about how the tire grips the road surface (for example, whether the tire reaches the critical region) in a similar manner to the calculation of the first target damping force.

As a result, the present embodiment prioritizes the control of the pitch control unit 24, which calculates a target pitch rate according to a roll rate, as long as the tire is in the linear region as the normal operation region while the vehicle is running, and variably control the target damping force at each wheel so as to achieve the target pitch rate, so that the roll rate and the pitch rate can be controlled into a proportional relationship.

As a result, it is possible to obtain a smooth cornering posture, in which the vehicle enters a corner in a nose-dive state and exits the corner in a squat state when the vehicle is turning the corner, thereby improving the roll feeling.

On the other hand, when the tire is in the critical region (i.e., the non-linear region) indicating that the tire cannot grip the road surface well, the second weight coefficient multiplication unit 37 calculates the second yaw rate weight coefficient Gp so that the coefficient Gp is set to "0" or a value close to "0", and corrects the target damping force calculated by the pitch control unit 24 to a smaller value with use of the second yaw rate weight coefficient Gp. As a result, the present embodiment adds a weight to the target damping force calculated by the roll suppression unit 19 to increase a roll suppression control amount, and therefore can generate a damping force to reduce the roll motion in proportion to the roll rate to actively reduce the roll motion, thereby improving the stability of the vehicle.

Now, a mode SW62 as a target pitch state value switching unit will be described. For example, a driver switches the mode SW62 manually. For example, the driver switches the mode SW62 from a normal mode to a sports mode, and this changes the value of the gain "Kpitch" of the gain multiplication unit 20 and the value of the gain (not illustrated) in the roll suppression unit 19. In this way, the value of the gain for switching the value of the target pitch state, and the value of the gain for roll suppression are changed, by which the value of the target pitch state can be switched.

In this way, according to the first embodiment, it is possible to perform optimum control according to a driving state of the vehicle by prioritizing improvement of the roll feeing when the tire is in the normal operation region while the vehicle is running, and prioritizing roll suppression focusing on the stability of the vehicle more than the roll feeing when the tire is in the critical region. As a result, it is possible to improve the stability of the vehicle body 1 in the critical region. Further, in the normal operation region, it is possible to ideally associate a pitch behavior and a roll behavior to improve a driver's feeling (roll feeling) while the vehicle is running.

In addition, the damping force characteristic of the damping force variable damper 6 or 9 at each wheel is controlled, in consideration of a pitch state to be generated at the vehicle body 1 by means of the GVC control unit 41, whereby a signal of target damping force at each of the wheels (i.e., the front left and right wheels 2 and the rear left and right wheels 3) to be output from the pitch control unit 24 can function as a control signal for pitch suppression, and work to increase the damping force at the front wheel positioned at the outer side of the vehicle body 1 while the vehicle is turning a corner, and the rear wheel positioned at the inner side of the vehicle body 1 while the vehicle is turning a corner, which wheels have a small damping force to obtain a roll motion with the head of the vehicle body 1 low. As a result, it is possible to actively reduce a roll motion and a pitch motion, and therefore possible to improve the stability of the vehicle.

In this way, the present embodiment can reduce a roll behavior and a pitch behavior while realizing ideal harmonious control of the pitch behavior and the roll behavior. Further, the present embodiment can maintain a nearly ideal tire state by reducing a pitch behavior generated by the GVC control unit 41 and a roll behavior generated by a steering operation, thereby reducing a roll-steer phenomenon and a bump-steer phenomenon, maximally realizing the tire capability, and improving the motion performance of the vehicle.

The inventors of the present invention conducted a simulation with use of a full vehicle model allowing a vertical motion, a translation motion, a yaw motion, a roll motion, and a pitch motion to be analyzed, so that advantageous effects of the present invention can be proved. Then, the inventors obtained the test results indicated in FIGS. 4 to 7, which will be described below. The inventors used CarSim (registered trademark) for vehicle motion calculation, and formulated models of the damping force variable damper, the brake hydraulic pressure control apparatus, and the controller with use of Matlab/Simulink (registered trademark). The inventors set values assuming a large rear-drive sedan as parameters of the vehicle model. The inventors set the conditions of the simulation as if a driver gradually turns a steering wheel to a certain angle, which is a simple transient cornering task, since semi-active suspensions are effective in transient cornering. The vehicle speed was 60 km/h, and the steering angle was 180 degrees.

A characteristic line 50 illustrated in FIG. 4A represents a change in the steering angle (degrees) when the driver operates the steering wheel. A characteristic line 51 represents the characteristic of a change in a lateral acceleration of the vehicle to which the present invention (the first embodiment) is employed. A characteristic line 51A represents the characteristic of a change in a lateral acceleration of a standard vehicle (hereinafter referred to as "comparative example 1") in which, for example, the damping force is not adjusted when the driver operates the steering wheel. A comparison between the characteristic lines 51 and 51A reveals that the prevent invention can reduce the lateral acceleration compared to the comparative example 1 when the vehicle is turning a corner.

Further, characteristic lines 52, 53, 54, and 55 indicated by solid lines in FIG. 4A represent damping force characteristics at the front right wheel (FR), the front left wheel (FL), the rear right wheel (RR), and the rear left wheel (RL) of the vehicle to which the present invention is employed as electric current values output to the actuators of the damping force variable dampers 6 and 9, respectively. On the other hand, characteristic lines 52A, 53A, 54A, and 55A represent damping force characteristics at the front right wheel (FR), the front left wheel (FL), the rear right wheel (RR), and the rear left wheel (RL) of the above-described comparative example 1 (a standard vehicle) as electric current values, respectively.

Characteristic lines 52B, 53B, 54B, and 55B indicated by long dashed double-dotted lines represent damping force characteristics at the front right wheel (FR), the front left wheel (FL), the rear right wheel (RR), and the rear left wheel (RL) of a vehicle including, for example, semi-active suspensions (hereinafter referred to as "comparative example 2") as electric current values, respectively. Characteristic lines 52C, 53C, 54C, and 55C indicated by long dashed dotted lines represent damping force characteristics at the front right wheel (FR), the front left wheel (FL), the rear right wheel (RR), and the rear left wheel (RL) of a vehicle including, for example, semi-active suspensions and performing the GVC control (hereinafter referred to as "comparative example 3") as electric current values, respectively.

Further, characteristic lines 52D, 53D, 54D, and 55D indicated by dotted lines represent damping force characteristics at the front right wheel (FR), the front left wheel (FL), the rear right wheel (RR), and the rear left wheel (RL) of a vehicle, for example, performing the GVC control but not adjusting damping forces when the driver operates the steering wheel (hereinafter referred to as "comparative example 4") as electric current values, respectively. The comparative example 4 does not adjust the damping forces, so the characteristic lines 52D, 53D, 54D, and 55D indicate 0 as electric values.

Figure 4B:
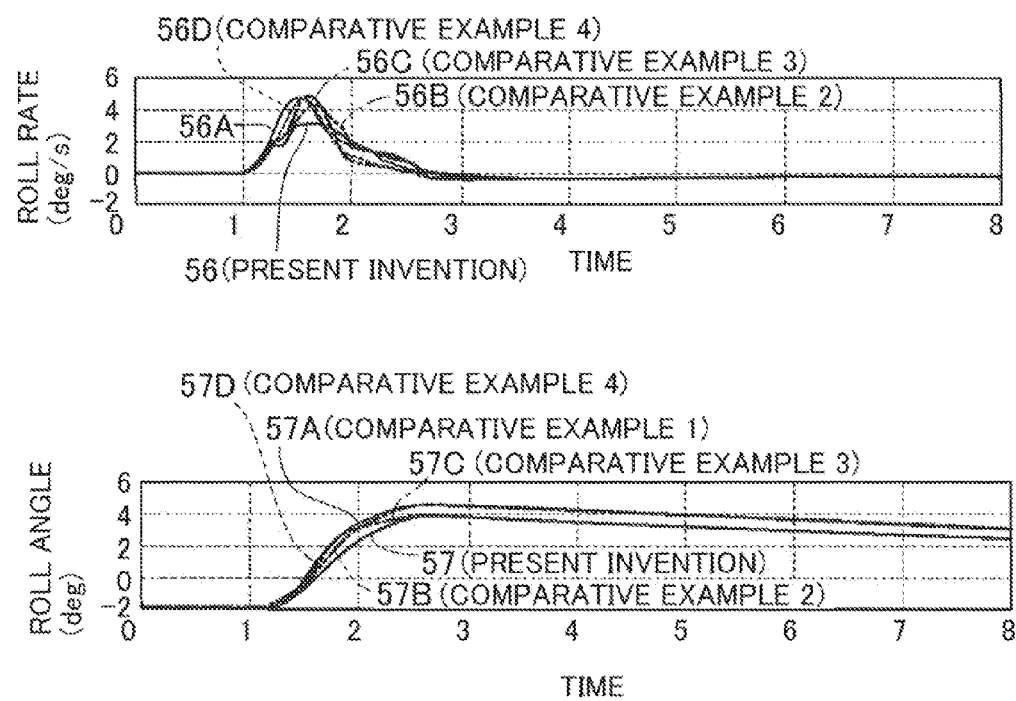
FIG. 4B illustrates simulation results respectively indicating a roll rate and a roll angle during a steering operation of a vehicle.

Next, a characteristic line 56 indicated by a solid line in FIG. 4B represents the characteristic of a roll rate in the vehicle to which the present invention is employed when the driver operates the steering wheel. A characteristic line 56A represents the characteristic of a roll rate in the comparative example 1. A characteristic line 56B indicated by a long dashed double-dotted line represents the characteristic of a roll rate in the comparative example 2. A characteristic line 56C indicated by a long dashed dotted line represents the characteristic of a roll rate in the comparative example 3. A characteristic line 56D indicated by a dotted line represents the characteristic of a roll rate in the comparative example 4.

Further, a characteristic line 57 indicated by a solid line represents the characteristic of a roll angle in the vehicle to which the present invention is employed when the driver operates the steering wheel, and a characteristic line 57A represents the characteristic of a roll angle in the comparative example 1. A characteristic line 57B indicated by a long dashed double-dotted line represents the characteristic of a roll angle in the comparative example 2. A characteristic line 57C indicated by a long dashed dotted line represents the characteristic of a roll angle in the comparative example 3. A characteristic line 57D indicated by a dotted line represents the characteristic of a roll angle in the comparative example 4.

The characteristic lines 52 to 55 illustrated in FIG. 4A reveals that, in the present invention, the damping forces have the hard characteristics even when the damping forces do not have hard characteristics, for example, in the comparative example 3 (semi-active suspensions and GVC control) as indicated by the characteristic lines 52C, 53C, 54C, and 55C. Further, the characteristic line 56 also reveals that the present invention reduces the roll rate most largely.

A characteristic line 58 indicated by a solid line in FIG. 5 represents the characteristic of a roll angle in the vehicle to which the present invention is employed when the driver operates the steering wheel, and a characteristic line 58A represents the characteristic of a roll angle in the comparative example 1. A characteristic line 58B indicated by a long dashed double-dotted line represents the characteristic of a roll angle in the comparative example 2. A characteristic line 58C indicated by a long dashed dotted line represent the characteristic of a roll angle in the comparative example 3. A characteristic line 58D indicated by a dotted line represents the characteristic of a roll angle in the comparative example 4. Further, a characteristic line 59 indicated by a solid line represents the characteristic of a pitch angle in the vehicle to which the present invention is employed when the driver operates the steering wheel, and a characteristic line 59A represents the characteristic of a pitch angle in the comparative example 1. A characteristic line 59B indicated by a long dashed double-dotted line represents the characteristic of a pitch angle in the comparative example 2. A characteristic line 59C indicated by a long dashed dotted line represent the characteristic of a pitch angle in the comparative example 3. A characteristic line 59D indicated by a dotted line represents the characteristic of a pitch angle in the comparative example 4.

Figure 6:
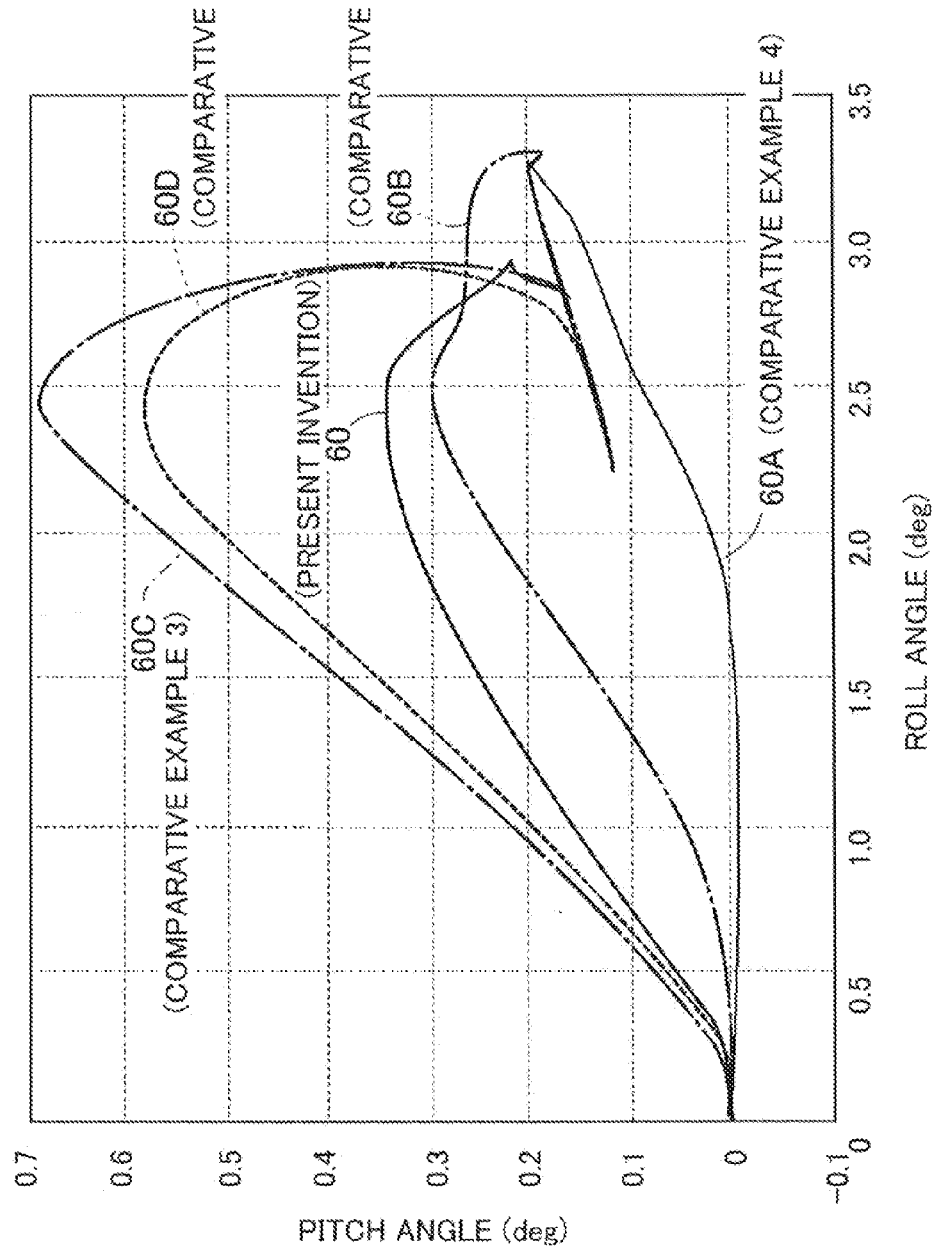
FIG. 6 illustrates a simulation result indicating the relationship between the roll angle and the pitch angle during the steering operation of the vehicle.

Next, a characteristic line 60 indicated by a solid line in FIG. 6 represents the relationship between the roll angle and the pitch angle in the vehicle to which the present invention is employed when the driver operates the steering wheel, and a characteristic line 60A represents the relationship between the roll angle and the pitch angle in the comparative example 1. A characteristic line 60B indicated by a long dashed double-dotted line represents the relationship between the roll angle and the pitch angle in the comparative example 2. A characteristic line 60C indicated by a long dashed dotted line represent the relationship between the roll angle and the pitch angle in the comparative example 3. A characteristic line 60D indicated by a dotted line represents the relationship between the roll angle and the pitch angle in the comparative example 4.

As understood from the characteristic line 60, in the present invention, a pitch motion is generated by deceleration control by the GVC, but the present invention can suppress generation of a pitch motion compared to the comparative example 3 (semi-active suspensions and the GVC control) indicated by the characteristic line 60C, and the comparative example 4 (only GVC) indicated by the characteristic line 60D, and can reduce the pitch motion to an almost same level to the comparative example 2 (only semi-active suspensions) indicated by the characteristic line 60B, which does not involve deceleration control. Further, the present invention can maintain the relationship between the roll angle and the pitch angle.

Figure 7:
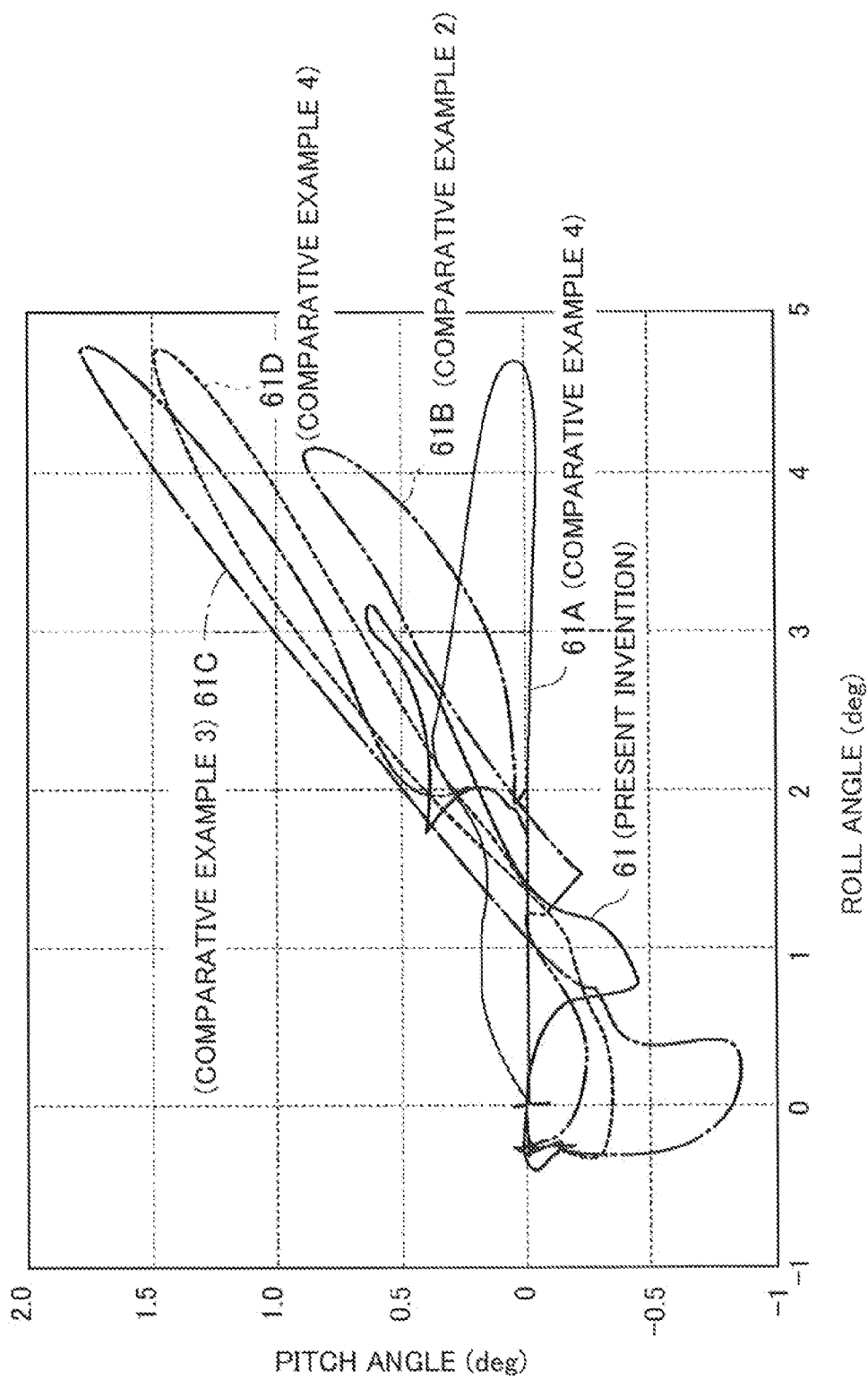
FIG. 7 illustrates a simulation result indicating the relationship between the roll rate and the pitch rate during the steering operation of the vehicle.

Further, a characteristic line 61 indicated by a solid line in FIG. 7 represents the relationship between the roll rate and the pitch rate in the vehicle to which the present invention is employed when the driver operates the steering wheel, and a characteristic line 61A indicates the relationship between the roll rate and the pitch rate in the comparative example 1. A characteristic line 61B indicated by a long dashed double-dotted line represents the characteristic of the relationship between the roll rate and the pitch rate in the comparative example 2. A characteristic line 61C indicated by a long dashed dotted line represents the characteristic of the relationship between the roll rate and the pitch rate in the comparative example 3. A characteristic line 61D indicated by a dotted line represents the characteristic of the relationship between the roll rate and the pitch rate in the comparative example 4. A comparison between the characteristic line 61 of the present invention and the characteristic lines 61A to 61D of the comparative examples 1 to 4 reveals that the present invention can reduce the pitch rate and the roll rate most largely while maintaining the excellent relationship between the roll rate and the pitch rate.

Therefore, according to the first embodiment, it is possible to reduce a roll behavior and a pitch behavior while realizing ideal harmonious control of the roll behavior and the pitch behavior. In addition, it is possible to maintain a nearly ideal state of the tire by reducing a pitch behavior generated by the GVC control unit 41 and a roll behavior generated from a steering operation, thereby reducing a roll-steer phenomenon and a bump-steer phenomenon, maximally utilizing the tire capability, and improving the motion performance of the vehicle.

As a result, it is possible to appropriately change the percentage of the control for improving the roll feeling and the percentage of the control for improving the stability according to the state of the vehicle, to improve the ride comfort and the steering stability of the vehicle as a whole. Then, it is possible to perform control of improving the roll feeing of the vehicle body 1 when the tire is in the normal operation region while focusing on the stability when the tire is in the critical region, thereby supporting the both performances at the same time. Further, the control in this case is configured to not switch the logic, but increase the gains and input signals of the existing logic, thereby supporting the both performances at the same time. Therefore, the control does not have to be discontinuously switched in the middle of the control, thereby realizing smooth control.

The first exemplary embodiment has been described based on an example in which the roll rate sensor 10 detects a roll rate and the pitch rate sensor 11 detects a pitch rate. However, the present invention is not limited thereto, and for example, the roll rate and the pitch rate may be calculated with use of a vertical acceleration sensor disposed at the vehicle body. Further, the relative speed of the damper may be calculated from a differential value of the vehicle height sensor. For example, the relative speed of the damper may be calculated by calculating a relative acceleration based on detection values from vertical acceleration sensors respectively disposed at the sprung side and unsprung side and integrating the relative acceleration. In sum, the present invention is not limited by specific calculation methods, and can be carried out using any calculation method.

Figure 8:
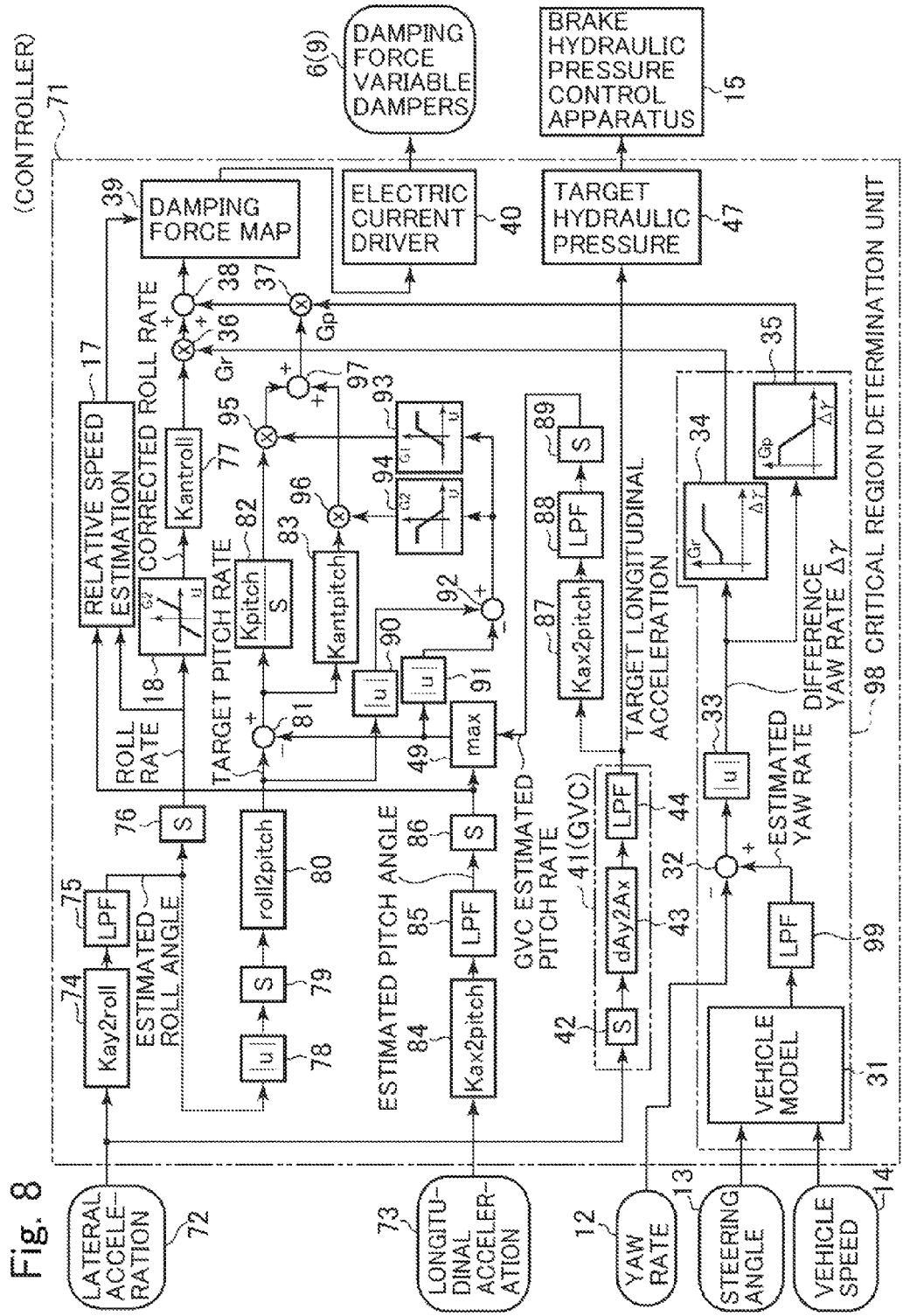
FIG. 8 is a control block diagram illustrating a vehicle motion control apparatus according to the second embodiment.

Next, FIG. 8 illustrates a second embodiment of the present invention. The second embodiment is characterized by omission of the roll rate sensor and the pitch rate sensor to simplify the system that performs, for example, suspension control. In the description of the second exemplary embodiments, like components will be identified by the same reference numerals as those in the above-described first exemplary embodiment, and the descriptions thereof will be omitted below.

In FIG. 8, reference numeral 71 denotes a controller as a control unit employed by the second exemplary embodiment. The input side of the controller 71 is connected to a lateral acceleration sensor 72 as a lateral acceleration detection unit and a longitudinal acceleration sensor 73 as a longitudinal acceleration detection unit, in addition to, for example, the yaw rate sensor 12, the steering angle sensor 13, and the vehicle speed sensor 14. The output side of the controller 71 is connected to, for example, the actuators (not illustrated) the damping force variable dampers 6 disposed at the front left and right wheels 2 and the damping force variable dampers 9 disposed at the rear left and right wheels 3, and the brake hydraulic pressure control apparatus 15.

In a similar manner to the controller 16 in the first embodiment, the controller 71 includes, for example, the relative speed estimation unit 17, the roll rate correction unit 18, the vehicle model unit 31, the difference calculation unit 32, the absolute value calculation unit 33, the first and second yaw rate map calculation units 34 and 35, the first and second weight coefficient multiplication units 36 and 37, the addition unit 38, the damping force map calculation unit 39, the electric current driver 40, the GVC control unit 41, and the target hydraulic pressure calculation unit 47.

As illustrated in FIG. 8, the controller 71 further includes, for example, a roll gain multiplication unit 74, a roll filter unit 75, a roll differential unit 76, a roll reduction unit 77, an absolute value calculation unit 78, a differential unit 79, a pitch gain multiplication unit 80, a difference calculation unit 81, a pitch calculation unit 82, gain multiplication units 83 and 84, a filter unit 85, a differential unit 86, a pitch gain multiplication unit 87, a pitch filter unit 88, a differential unit 89, absolute vale calculation units 90 and 91, a difference calculation unit 92, first and second pitch rate map calculation units 93 and 94, first and second pitch rate weight coefficient multiplication units 95 and 96, an addition unit 97, and a filter unit 99 of a critical region determination unit 98, as will be described below.

In a similar manner to the first exemplary embodiment, the GVC control unit 41 includes the differential unit 42, the gain multiplication unit 43, and the filter unit 44. However, in the GVC control unit 41 in the second embodiment, the differential unit 42 differentiates a lateral acceleration detected by the lateral acceleration sensor 72 to calculate a lateral jerk. The gain multiplication unit 43 multiplies the calculated lateral jerk by a gain. The filter unit 44 performs LPF processing, thereby outputting a target longitudinal acceleration. The target hydraulic pressure calculation unit 47, which is the subsequent stage, calculates a target hydraulic pressure from the calculated target longitudinal acceleration. The brake hydraulic pressure control apparatus 15 generates a hydraulic pressure according to the target hydraulic pressure. This control can realizes the GVC control harmoniously controlling the lateral acceleration and the longitudinal acceleration.

Next, the roll gain multiplication unit 74 multiplies the lateral acceleration detected by the lateral acceleration sensor 72 by a roll angle/lateral acceleration gain "Kay2roll" (degrees/ms$^2$), which is calculated from the relationship of a roll angle to a lateral acceleration, to calculate a roll angle. However, this calculation, if nothing added thereto, does not reflect the dynamic characteristic from generation of a lateral acceleration to generation of a roll angle. Therefore, the roll filter unit 75, which is the subsequent stage, reproduces the dynamics by performing LPF processing approximately expressing the dynamic characteristic.

Next, the roll differential unit 76 differentiates the thus-calculated roll angle to calculate a roll rate for roll suppression control. If the roll rate calculated by the roll differential unit 76 is large, it is highly likely that the steering speed is high, and a rollover occurs. Therefore, when the roll rate is large, the roll rate correction unit 18, which is the subsequent stage, prioritizes the stability, and calculates a corrected roll rate with use of a non-linear gain for an apparent increase in the roll rate.

When the corrected roll rate is input to the roll suppression unit 77, the roll suppression unit 77 multiplies the corrected roll rate by a gain "Kantroll" to calculate a target damping force for roll suppression to perform the control for suppressing the roll motion. The first weight coefficient multiplication unit 36 is configured in a similar manner to the first embodiment, and multiplies a target damping force for performing the roll suppression control (stability improvement control), which is output from the roll suppression unit 77 to the damping force variable damper 6 or 9 at each wheel, by the first yaw rate weight coefficient Gr, thereby adding a weight to the target damping fore for stability improvement.

Next, the absolute value calculation unit 78 calculates an absolute value of a signal (an estimated roll angle) output from the roll filter unit 75. The differential unit 79 differentiates the absolute value of the estimated roll angle. The gain multiplication unit 80, which is the subsequent stage, multiples this value by a gain "roll2pitch" to calculate a target pitch rate.

Further, although not illustrated, the vehicle state can be switched by changing the values of the gain "roll2pitch" of the gain multiplication unit 80 and the gain "Kantroll" of the roll suppression unit 77 by the mode SW.

Next, the difference calculation unit 81 calculates a difference between the maximum value of pitch rate output from the maximum value selection unit 49 and the target pitch rate as a difference pitch rate. The pitch calculation unit 82 and the gain multiplication unit 83, which are subsequent stages, calculate a target damping force at each wheel from the difference pitch rate output form the difference calculation unit 81 by FF control in consideration of the dynamics in the pitch direction, so as to achieve the target pitch rate. In this case, the pitch calculation unit 82 integrates the difference pitch rate and multiples it by a gain "Kpitch". The gain multiplication unit 83 multiplies the difference pitch rate by a gain "Kantpitch".

On the other hand, the gain multiplication unit 84 multiplies the longitudinal acceleration detected by the longitudinal acceleration sensor 73 by a pitch angle/longitudinal acceleration gain "Kax2pitch" [degrees/(m/s$^2$)] calculated from the relationship of a pitch angle to a longitudinal acceleration, to calculate an estimated pitch angle. However, this calculation, if nothing added thereto, does not reflect the dynamic characteristic from generation of a lateral acceleration to generation of a pitch angle. Therefore, the pitch filter unit 85, which is the subsequent stage, reproduces the dynamics by performing LPF processing approximately expressing the dynamic characteristic. The differential unit 86, which is the subsequent stage, differentiates the estimated pitch angle to calculate a first estimated pitch rate. The signal of the first estimated pitch rate is output to the relative speed estimation unit 17 and the maximum value selection unit 49.

Further, the pitch gain multiplication unit 87 multiplies the target longitudinal acceleration output from the above-described GVC control unit 41 by a pitch angle/longitudinal acceleration gain "Kax2pitch". The pitch filter unit 88, which is the subsequent stage, reproduces the dynamics by performing the LPF processing approximately representing the dynamic characteristic to calculate a GVC estimated pitch angle. The differential unit 89, which is the subsequent stage, differentiates this GVC estimated pitch angle to calculate a second estimated pitch rate. The second estimated pitch rate is output to the maximum value selection unit 49 as a signal of the GVC estimated pitch rate.

The maximum value selection unit 49 selects a larger one of the signal values of the first and second estimated pitch rates (GVC estimated pitch rates) as a maximum value, and outputs this maximum value to the difference calculation unit 81. Therefore, the pitch control unit (i.e., the pitch calculation unit 82 and the gain multiplication unit 83) can calculate a target damping force by pitch control to improve the roll feeling based on the maximum value and the target pitch rate.

However, if the above-described maximum value (the pitch rate generated by the GVC or the longitudinal acceleration) is larger than the target pitch rate, an object in this case is to reduce the pitch motion. Therefore, the absolute value calculation unit 90 calculates an absolute value of the target pitch rate, and the other absolute calculation unit 91 calculates an absolute value of the above-described maximum value (the estimated pitch rate). The difference calculation unit 92, which is the subsequent stage, calculates a difference u between the absolute values output from the absolute value calculation units 90 and 91.

The first pitch rate map calculation unit 93 calculates a first pitch rate weight coefficient G1 based on the difference u between the absolute values with use of a map. More specifically, as indicated in the map calculation unit 93 in FIG. 8, the first pitch rate weight coefficient G1 is set to, for example, a value smaller than "1" when the difference u between the absolute values is a minus value (a negative value). The first pitch rate weight coefficient gradually increases to be set to, for example, "1" or a value larger than "1" when the difference u between the absolute values is equal to or larger than 0 and increases in the plus direction (increases as a positive value).

The second pitch rate map calculation unit 94 calculates a second pitch rate weight coefficient G2 based on the difference u between the absolute values with use of a map. As indicated in the map calculation unit 94 in FIG. 8, the second pitch rate weight coefficient G2 is set to, for example, a value smaller than "1" when the difference u between the absolute values is a plus value (a positive value). The second pitch rate weight coefficient gradually increases to be set to, for example, "1" or a value larger than "1" when the difference u between the absolute values is equal to or smaller than 0 and increases at the minus side (negative value). In other words, the second pitch rate weight coefficient G2 gradually reduces to be set to a value close to "0" when the first pitch rate weight coefficient G1 gradually increases, and is set to, for example, "1" or a value larger than "1" when the first pitch rate weight coefficient G1 gradually reduces.

The first pitch rate weight coefficient multiplication unit 95 multiplies a signal of target damping force to be output from the pitch calculation unit 82 to the damping force variable damper 6 or 9 at each wheel by the first pitch rate weight coefficient G1 to add a weight to the target damping force for pitch generation. The second pitch rate weight coefficient multiplication unit 96 multiplies a signal of target damping force to be output from the gain multiplication unit 83 to the damping force variable damper 6 or 9 at each wheel by the second pitch rate weight coefficient G2 to add a weight to the target damping force for pitch suppression.

The addition unit 97, which is the subsequent stage, adds the target damping force output from the first pitch rate weight coefficient multiplication unit 95 and the target damping force output from the second pitch rate weight coefficient multiplication unit 96, which are corrected to be weighted according to the difference u between the absolute values of the maximum value (the pitch rates generated by the GVC and the longitudinal acceleration) and the target pitch rate as described above, and outputs the resultant value to the second weight coefficient multiplication unit 37.

In this way, according to the second exemplary embodiment, the pitch control unit in consideration of the GVC control is constituted by, for example, the absolute value calculation unit 78, the differential unit 79, the gain multiplication unit 80, the difference calculation unit 81, the pitch calculation unit 82, the gain multiplication unit 83, the other gain multiplication unit 84, the filter unit 85, the differential unit 86, the pitch gain multiplication unit 87, the pitch filter unit 88, the differential unit 89, the maximum value selection unit 49, the absolute value calculation units 90 and 91, the difference calculation unit 92, the pitch rate map calculation units 93 and 94, the pitch rate weight coefficient multiplication units 95 and 96, and the addition unit 97.

The difference calculation unit 92 calculates the difference u between the absolute values output from the absolute value calculation units 90 and 91. If the difference u between the absolute values is a plus value, this means that the target pitch rate is larger than the pitch rate to be generated by the GVC and the longitudinal acceleration, so the pitch rate map calculation units 93 and 94, the pitch rate weight coefficient multiplication units 95 and 96, and the addition unit 97 allow a control term for generating a pitch state in consideration of the pitch dynamics to be utilized to generate a pitch state according thereto.

On the other hand, if the difference u between the absolute values is a minus value, this means that the estimated pitch rate by the GVC control unit 41 (or the pitch rate generated by the longitudinal acceleration) is larger than the target pitch rate, and it is possible to utilize a control term for suppressing a pitch state to perform control for suppressing a pitch state.

Next, a critical region determination unit 98, which determines whether the state about how the tire grips the road surface while the vehicle is running reaches the critical region (the non-linear region) from the normal operation region (the linear region), will be described. This critical region determination unit 98 constitutes a vehicle motion determination unit in a similar manner to the critical region determination unit 30 described in the description of the first embodiment, and includes the vehicle model unit 31, the difference calculation unit 32, the absolute value calculation unit 33, and the first and second yaw rate map calculation units 34 and 35. However, the critical region determination unit 98 in the second embodiment further includes a filter unit 99 between the vehicle model unit 31 and the difference calculation unit 32.

The filter unit 99 performs the LPF processing approximately representing the dynamic characteristic to reproduce the dynamics.

The critical region determination unit 98, which is constituted by, for example, the vehicle model unit 31, the filter unit 99, the difference calculation unit 32, the absolute value calculation unit 33, and the first and second yaw rate map calculation units 34 and 35, inputs the difference yaw rate $\Delta\gamma$ calculated by the difference calculation unit 32 and the absolute value calculation unit 33 to the first and second yaw rate map calculation units 34 and 35 to acquire the first and second yaw rate weight coefficients Gr and Gp, in a similar manner to the critical region determination unit 30 described in the description of the first exemplary embodiment.

Then, the first weight coefficient multiplication unit 36 multiples the target damping force calculated by the roll suppression unit 77 by the first yaw rate weight coefficient Gr to calculate the first target damping force corrected according to the critical region of the tire. Further, the second weight coefficient multiplication unit 37 multiplies the target damping force output from the addition unit 97 by the second yaw rate weight coefficient Gp, and calculates the second target damping force corrected according to the critical region in a similar manner to the first target damping force. In this way, the present embodiment adjusts the control amounts of the roll suppression control and the pitch control according to the difference yaw rate $\Delta\gamma$.

Further, the relative speed estimation unit 17 estimates a relative speed of each wheel by using the geometrical relationship based on the roll rate calculated by the differential unit 76, the pitch rate calculated by the other differential unit 86, and the specification of the vehicle. The addition unit 38 calculates a target damping force at each wheel by adding the roll suppression control amount (first target damping force) and the pitch control amount (second target damping force), which are calculated as described above. The damping force map calculation unit 39 calculates an instructed electric current value based on the target damping force and the estimated relative speed from damping force characteristics (damping force-electric current value-relative speed) stored in advance. The electric current driver 40 outputs an electric current corresponding to the calculated electric current value to the actuator of the damping force variable damper 6 or 9 to variably control the respective damping force characteristics.

In this way, the thus-configured second embodiment can also improve the ride comfort and the steering stability as a whole by appropriately improving the roll feeing and the stability according to the state of the vehicle, in a similar manner to the first embodiment. Especially, the second embodiment can control the posture of the vehicle body 1 based on the detection signals from the lateral acceleration sensor 72, the longitudinal acceleration sensor 73, the yaw rate sensor 12, the steering angle sensor 13, and the vehicle speed sensor 14 without using the roll rate sensor and the pitch rate sensor.

As a result, it is possible to reduce the number of sensors, leading to cost-cutting and simplification of the system. Further, the second embodiment controls the damping force characteristic by an instructed electric current to the damping force variable damper 6 or 9, which the controller 71 calculates based on the signals detected by the yaw rate sensor 12, the steering angle sensor 13, the vehicle speed sensor 14, the lateral acceleration sensor 72, and the longitudinal acceleration sensor 73. Therefore, it is possible to realize improvement of the roll feeling and improvement of the stability in the critical region.

In addition, the second embodiment controls the suspension in consideration of a pitch motion generated by the GVC control. Therefore, normally, a pitch rate generated by the GVC control unit 41 is larger than the target pitch rate, so the pitch control can function as pitch suppression control and work to increase the damping forces at the front wheel positioned at the outer side of the vehicle body 1 while the vehicle is turning a corner, and the rear wheel positioned at the inner side of the vehicle body 1 while the vehicle is turning a corner, which wheels have a small damping force for a roll motion with the head of the vehicle body 1 low. Therefore, it is possible actively suppress a roll motion and a pitch motion, thereby improving the stability of the vehicle.

The lateral acceleration and the longitudinal acceleration are detected by using the sensors 72 and 73, respectively. However, the longitudinal acceleration may be calculated by differentiating the vehicle speed or may be calculated from a braking/driving force such as an engine torque, a motor torque, and a brake torque. Similarly, the lateral acceleration may be also calculated from the steering angle and the vehicle speed with use of a vehicle model in a similar manner to the first embodiment. The lateral acceleration and the longitudinal acceleration may be acquired by any calculation method.

Figure 9:
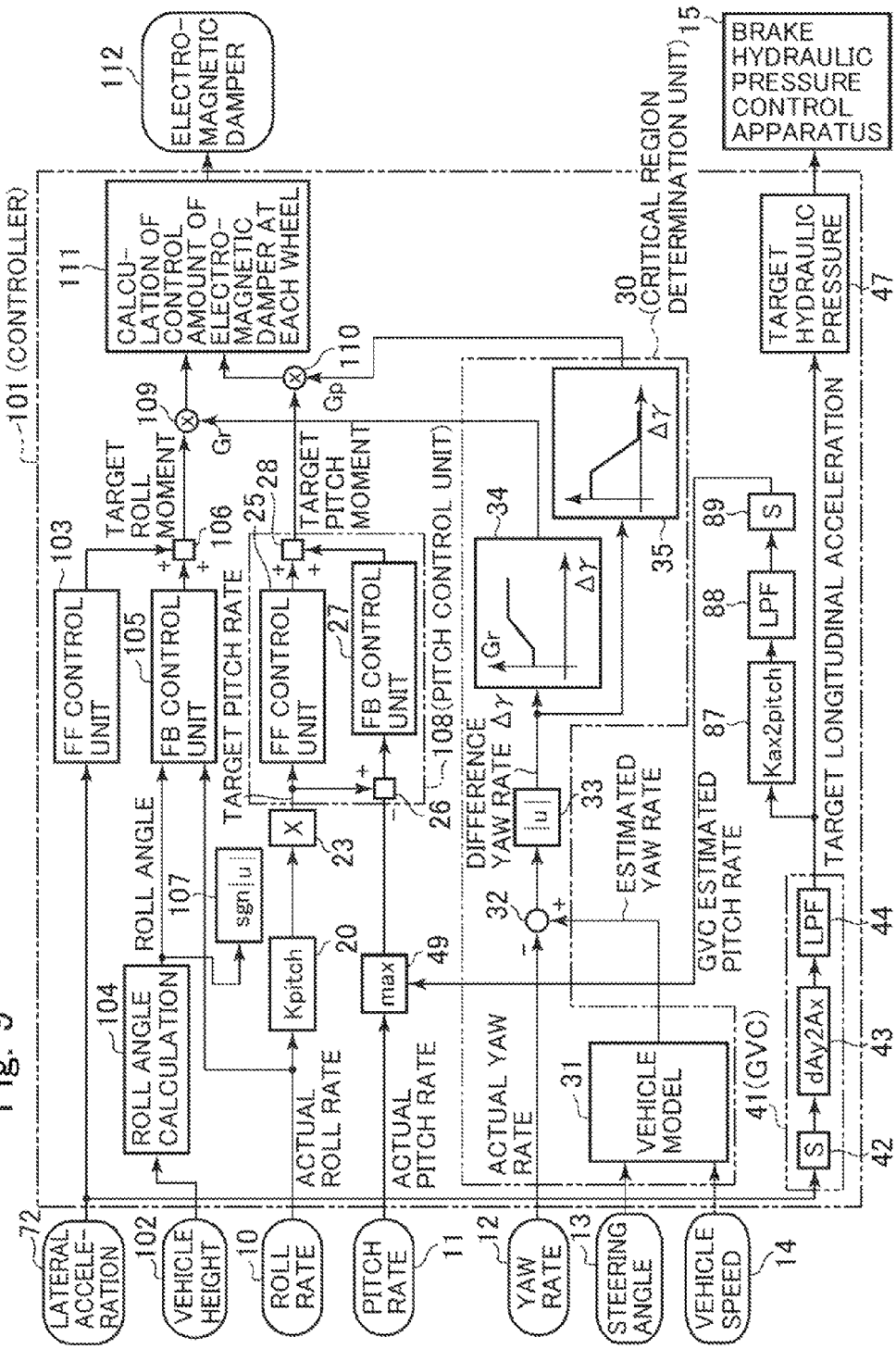
FIG. 9 is a control block diagram illustrating a vehicle motion control apparatus according to a third embodiment.
Figure 10:
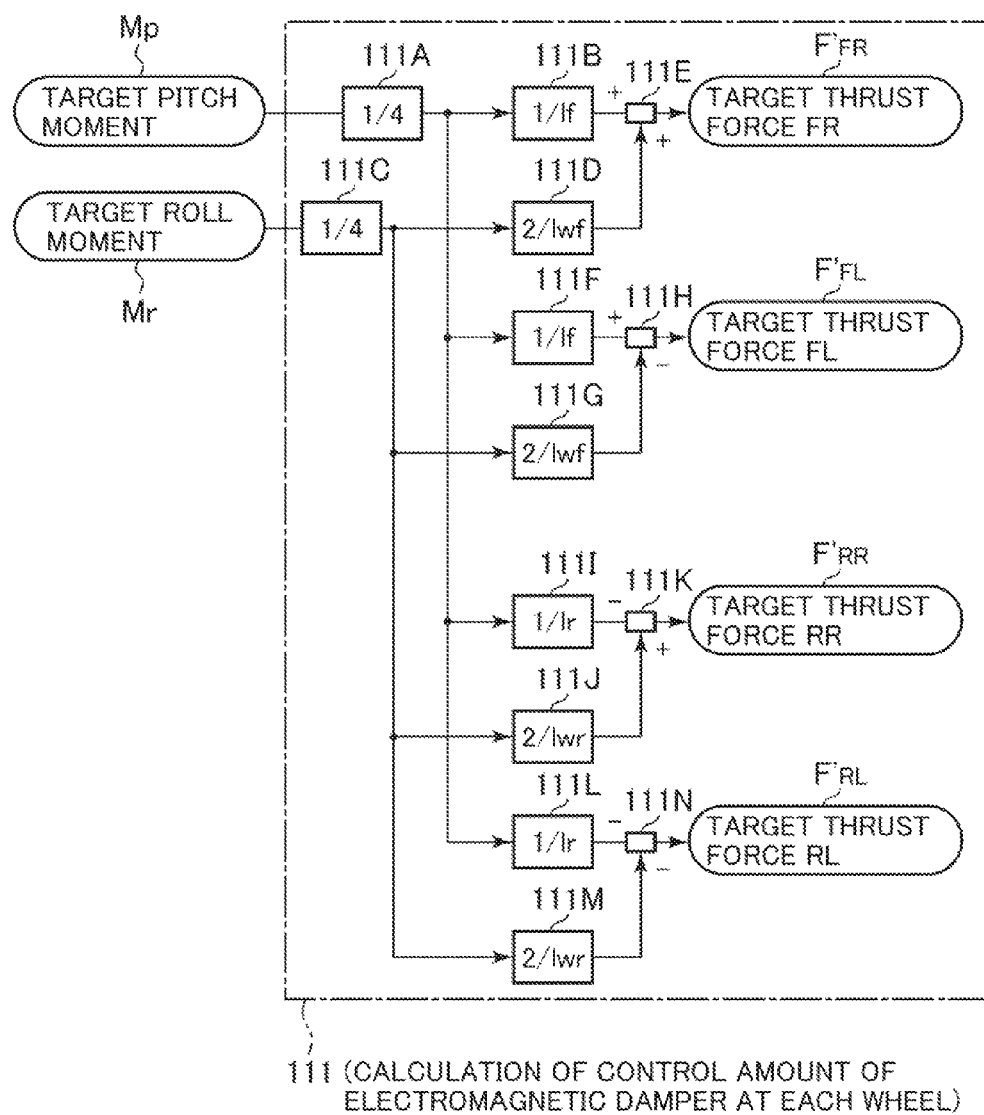
FIG. 10 is a control block diagram illustrating processing by an electromagnetic damper control amount calculation unit illustrated in FIG. 8 for calculating a target thrust force at each wheel from a target pitch moment and a target roll moment.

Next, FIGS. 9 and 10 illustrate a third embodiment of the present invention. The third embodiment is characterized in that the actuator in charge of posture control of the vehicle body is not a semi-active suspension (for example, a damping force adjustable hydraulic shock absorber), and is embodied by an active suspension capable of generating a thrust force by itself. In the description of the third exemplary embodiments, like components will be identified by the same reference numerals as those in the above-described first exemplary embodiment, and the descriptions thereof will be omitted below.

In FIG. 9, reference numeral 101 denotes a controller as a control unit employed in the present embodiment. The controller 101 is configured in an almost same manner as the controller 16 described in the description of the first embodiment. The input side of the controller 101 is connected to, for example, the roll rate sensor 10, the pitch rate sensor 11, the yaw rate sensor 12, the steering angle sensor 13, and the vehicle speed sensor 14. Further, the input side of the controller 101 is connected to a lateral acceleration sensor 72 as a lateral acceleration detection unit, and a plurality of vehicle height sensors 102. The vehicle height sensors 102 respectively individually detect the vehicle heights at the front left and right wheels 2 and the rear left and right wheels 3.

Further, the output side of the controller 101 is connected to, for example, electromagnetic dampers 112 disposed at the front left and right wheels 2 and the rear left and right wheels 3, which will be described below, and the brake hydraulic pressure control apparatus 15. The controller 101 in this case is different from the first exemplary embodiment in terms that the output side of the controller 101 is connected to, for example, active suspensions (the electromagnetic dampers 112 which will be described below) capable of generating a thrust force by themselves.

The controller 101 includes an FF control unit 103, a roll angle calculation unit 104, an FB control unit 105, an addition unit 106, the gain multiplication unit 20, a sign determination unit 107, the multiplication unit 23, a pitch control unit 108, the critical region determination unit 30, first and second weight coefficient multiplication units 109 and 110, an electromagnetic damper control amount calculation unit 111 at each wheel, the GVC control unit 41, the target hydraulic pressure calculation unit 47, the maximum value selection unit 49, the pitch gain multiplication unit 87, the pitch filter unit 88, and the differential unit 89.

Among the above-described components, the gain multiplication unit 20, the multiplication unit 23, the critical region determination unit 30, the GVC control unit 41, the target hydraulic pressure control unit 47, and the maximum value selection unit 49 are configured in a similar manner to the first embodiment. Further, as described in the description of the second embodiment, the pitch gain multiplication unit 87, the pitch filter unit 88, and the differential unit 89 calculate a GVC estimated pitch rate according to a target longitudinal acceleration output from the GVC control unit 41, and outputs it to the maximum value selection unit 49.

The maximum value selection unit 49 selects a larger one of an actual pitch rate output from the pitch rate sensor 11 and a signal value of the GVC estimated pitch rate as a maximum value, and outputs this maximum value to the difference calculation unit 26 of the pitch control unit 108. As a result, the pitch control unit 108 can calculate a target damping force by the pitch control for improving the roll feeling based on the above-described maximum value and the target pitch rate.

Reference numeral 112 denotes a plurality of electromagnetic dampers (for example, four electromagnetic dampers) disposed at the respective wheels of the vehicle. The electromagnetic dampers 112 are constituted by, for example, active suspensions that are cylinder apparatuses respectively disposed at the front left and right wheels 2 and the rear left and right wheels 3. Each of the electromagnetic dampers 112 generates a thrust force for vertically lowering or raising the vehicle body 1 at each wheel side according to a control signal from the electromagnetic damper control amount calculation unit 111 at each wheel.

The FF control unit 103 of the controller 101 calculates a target roll moment for performing the roll suppression control based on a lateral acceleration signal of the vehicle body 1, which is output from the lateral acceleration sensor 104, and outputs it to the addition unit 106. The addition unit 106 corrects the target roll moment by adding the target roll moment calculated by the FF control unit 103 and a target roll moment calculated by the FB control unit 105, which will be described below, and outputs the corrected value to the first weight coefficient multiplication unit 109, which is a subsequent stage, as the target roll moment.

The roll angle calculation unit 104 of the controller 101 calculates a roll angle of the vehicle body 1 based on a vehicle height signal output from each vehicle height sensor 102. The FB control unit 105, which performs feedback control, calculates a target roll moment for performing the roll suppression control based on a roll rate from the roll rate sensor 10 and a roll angle from the roll angle calculation unit 104, and outputs the target roll moment to the first weight coefficient multiplication unit 109 via the above-described addition unit 106.

Next, the sign determination unit 107 determines the sign of a roll angle in a similar manner to the sign determination unit 22 described in the description of the first embodiment (for example, a right-hand roll angle corresponds to a positive value and a left-hand roll angle corresponds to a negative value). The multiplication unit 23 calculates a target pitch rate as a corrected value by multiplying the roll rate from the gain multiplication unit 20 by the sign in such a manner that the vehicle is constantly in a dive state (a pitch state with the head low) when the roll state increases or in a squat state (a pitch state with the head high) when the roll state decreases.

The pitch control unit 108 of the controller 101 includes the FF control unit 25, the difference calculation unit 26, the FB control unit 27, and the addition unit 28, in an approximately same manner as the pitch control unit 24 described in the description of the first embodiment. The pitch control unit 108 adds the target pitch moment calculated by the FF control unit 25 and the target pitch moment calculated by the FB control unit 27 at the addition unit 28, and outputs the resultant value to the second weight coefficient multiplication unit 110 as a target pitch moment for improving the roll feeling.

The first weight coefficient multiplication unit 109 multiplies the target roll moment for the roll suppression control (the stability improvement control), which is output from the addition unit 106 to the electromagnetic damper control amount calculation unit 111 at each wheel, by the first yaw rate weight coefficient Gr output from the first yaw rate map calculation unit 34 to add a weight to the target roll moment for the stability improvement. The second weight coefficient multiplication unit 110 multiplies the target pitch moment for the pitch control (the roll feeling improvement control), which is output from the pitch control unit 108 to the electromagnetic damper control amount calculation unit 111 at each wheel, by the second yaw rate weight coefficient Gp output from the second yaw rate map calculation unit 35 to add a weight to the target pitch moment for the roll feeling improvement.

Next, as illustrated in FIG. 10, the electromagnetic damper control amount calculation unit 11 at each wheel includes blocks 111A to 111D, 111F, 111G, 111I, 111J, 111L, and 111M, and calculation units 111E, 111H, 111K, and 111N, and performs calculation for distributing the target pitch moment and the target roll moment to the respective wheels (i.e., the front left and right wheels 2 and the rear left and right wheels 3).

More specifically, the electromagnetic damper control amount calculation unit 11 at each wheel calculates an electromagnetic damper control amount so as to allow the electromagnetic damper 112 at each wheel to generate a target thrust force $F'_{FR}$, $F'_{FL}$, $F'_{RR}$, or $F'_{RL}$ corresponding to the target pitch moment and the target roll moment distributed to each wheel side, and individually outputs a control signal corresponding to the calculated control amount (the target thrust force $F'_{FR}$, $F'_{FL}$, $F'_{RR}$, or $F'_{RL}$) to each electromagnetic damper 112.

The block 111A of the electromagnetic damper control amount calculation unit 111 divides the target pitch moment $M_p$ in quarters, and equally distribute them to the respective wheels. The subsequent block, the block 111B divides the equally distributed moment ($M_p/4$) by the distance lf from the front right wheel to the center of gravity at the front wheels 2. The block 111C divides the target roll moment $M_r$ in quarters, and equally distribute them to the respective wheels. The subsequent block, the block 111D divides the equally distributed roll moment ($M_r/4$) by a half of a tread (1wf/2). The calculation unit 111E adds the value ($M_p/4$lf) output from the block 111B and the value ($M_r/2$1wf) output from the block 111D to calculate the target thrust force $F'_{FR}$ at the front right wheel 2.

Further, the subsequent block, the block 111F divides the equally distributed pitch moment ($M_p/4$) by the distance lf from the front left wheel to the center of gravity at the front wheels 2. The block 111G divides the equally distributed roll moment ($M_r/4$) by a half of the tread (1wf/2). The calculation unit 111H subtracts the value ($M_r/2$1wf) output from the block 111G from the value ($M_p/4$lf) output from the block 111F to calculate the target thrust force $F'_{FL}$ at the front left wheel 2.

On the other hand, the block 111I of the electromagnetic damper control amount calculation unit 111 divides the equally distributed pitch moment ($M_p/4$) by a distance lr from the rear right wheel to the center of gravity at the rear wheels 3. The block 111J divides the equally distributed roll moment ($M_r/4$) by a half of the tread ($1wr/2$). The calculation unit 111K subtracts the value ($M_p/4lr$) output from the block 111I from the value ($M_r/21wf$) output from the block 111J to calculate the target thrust force $F'_{RR}$ at the rear right wheel 3.

Further, the block 111L divides the equally distributed pitch moment ($M_p/4$) by the distance lr from the rear left wheel to the center of gravity at the rear wheels 3. The block 111M divides the equally distributed roll moment ($M_r/4$) by a half of the tread ($1wr/2$). The calculation unit 111N adds the value ($M_p/4lr$) output from the block 111L and the value ($M_r/21wr$) output from the block 111M, and sets the sign to a negative (minus) sign to calculate the target thrust force $F'_{RL}$, at the rear left wheel 3.

In this way, the thus-configured third embodiment also adds a weight to the target roll moment and the target pitch moment by the first and second weight coefficient multiplication units 109 and 110, and therefore can appropriately improve the roll feeling and the stability according to the state of the vehicle, thereby improving the ride comfort and the steering stability of the vehicle as a whole, in a similar manner to the first embodiment.

Especially, in the third embodiment, the electromagnetic damper control amount calculation unit 111 calculates the target thrust force $F'_{FR}$, $F'_{FL}$, $F'_{RR}$, or $F'_{RL}$ at each wheel, and causes the electromagnetic damper 112 (the active suspension) to generate a thrust force according to the target value, and therefor can generate a pitch rate proportional to a roll rate. As a result, it is possible to stabilize the rotational axis of the vehicle body 1, thereby improving the roll feeling and the stability.

The third embodiment has been described based on an example in which the blocks 111A and 111C of the electromagnetic damper control amount calculation unit 111 illustrated in FIG. 10 equally distribute the target roll moment and the target pitch moment to the respective wheels. However, the present invention is not limited thereto, and for example, may acquire a control amount at each wheel to satisfy a balance equation of a roll moment and a pitch moment.

Further, the first to third embodiments have been described based on an example in which the brake force control unit is constituted by, for example, the GVC control unit 41 and the target hydraulic pressure calculation unit 47. However, the present invention is not limited thereto. For example, the present invention may include a brake force control unit that controls the brake force in consideration of influence exerted by a driver and a navigation cooperation system, in addition to the GVC control.

Further, the first to third exemplary embodiments have been described based on an example that determines whether the tire is in the critical region while the vehicle is running based on a difference between the actual yaw rate and the estimated yaw rate, and changes the control ratio between the pitch control for improving the roll feeling and the roll suppression control for improving the stability according to the result of the determination. However, the present invention is not limited thereto, and, if it is possible to estimate that the tire reaches the critical range (determine that the tire is in the critical condition) thereafter, the present invention may control the control ratio so as to increase the percentage of the roll suppression control for improving the stability over the pitch control for improving the roll feeling in advance.

Further, the first and third embodiments have been described based on an example detecting a roll rate and a pitch rate by using sensors, respectively. However, the present invention is not limited thereto, and may calculate a roll rate and a pitch rate by, for example, using three or more vertical acceleration sensors mounted on the vehicle body.

Further, the relative speed used in the first and second embodiments may be a differential value of the vehicle height sensor, or may be calculated by, for example, calculating a relative acceleration from detection values of the acceleration sensors on the sprung side and the unsprung side, and integrating them. Alternatively, if the vehicle is running on a flat road surface, it can be estimated that the vehicle has almost no motion at the unsprung side, whereby the relative speed may be acquired by integrating a detection value of the acceleration sensor at the sprung side and using the integrated sprung speed as the relative speed. Further, the second embodiment uses the lateral acceleration estimated from the steering angle and the vehicle speed, but may use a value of the lateral acceleration sensor. The other signals may be also calculated by any methods.

Next, inventions included in the above-described embodiments will be described. According to the present invention, the vehicle motion control apparatus includes the target pitch state value switching unit capable of switching a value of a target pitch state. Therefore, the vehicle motion control apparatus is configured to increase gains and input signals of the existing logic instead of switching a control logic, as a result of which it is possible to realize smooth control without discontinuously switching the control.

Further, according to the present invention, the vehicle motion control apparatus includes the target roll state calculation unit that calculates a target roll state from how the vehicle is turning a corner. The force adjustment unit is configured to adjust a force of the force generation apparatus in such a manner that the roll state of the vehicle body approaches the above-described target roll state. As a result, it is possible to reduce a roll behavior and a pitch behavior while realizing ideal harmonious control of the pitch behavior and the roll behavior.

For example, it is possible to reduce a pitch behavior generated by the GVC and a roll behavior generated by a steering operation, and therefore maintain a nearly ideal state of the tire (reduce roll-steer and bump-steer phenomena). As a result, it is possible to maximally utilize the performance of the tire to improve the motion performance. Further, according to the present invention, the above-described force generation apparatus is a shock absorber, and is configured to adjust a damping force by the above-described force adjustment unit. Further, the brake control unit is configured to adjust the longitudinal acceleration according to the lateral jerk.

Having described exemplary embodiments of the present invention, a technical idea of the present invention is a vehicle motion control apparatus used in a vehicle including a brake force control unit that generates a brake force at the vehicle while the vehicle is turning a corner to change a posture of a vehicle body in a pitch direction. The vehicle motion control apparatus includes a plurality of force generation apparatuses capable of generating an adjustable force between the vehicle body and each wheel, such as a damping force adjustable shock absorber, an air suspension, a hydraulic active suspension, or an electromagnetic suspension, disposed between the vehicle body of the vehicle and a plurality of wheels. Then, the vehicle motion control apparatus adjusts forces generated by the brake force control unit and the force generation apparatuses so as to approach an ideal pitch state, i.e., a target pitch state. Further, in addition to the above-described technical idea, the vehicle motion control apparatus also controls generation of a roll state so as to approach an ideal roll state, i.e., a target roll state. As a result, it is possible to obtain the ideal pitch state and the ideal roll state, and improve the steering stability.

According to the above-described embodiments, it is possible to realize excellent harmonious control of a pitch state and a roll state.

According to the above-described embodiments, it is possible to provide a vehicle motion control apparatus and a suspension control apparatus capable of improving turning operability, steering stability, and a ride comfort while a vehicle is running, in cooperation with a brake force control unit.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2011-211288 filed on Sep. 27, 2011. The entire disclosure of No. 2011-211288 filed on Sep. 27, 2011 including specification, claims, drawings and summary is incorporated herein by reference in its entirety.

What is claimed is:

1. A vehicle motion control apparatus configured to be used with a vehicle including a brake apparatus capable of generating a brake force during a steering operation of the vehicle, the vehicle motion control apparatus comprising:
a brake control apparatus configured to control the brake apparatus so as to generate a predetermined brake force based on a target longitudinal acceleration calculated according to a steering operation of the vehicle;
a plurality of force generation apparatuses disposed between a vehicle body of the vehicle and a plurality of axles, each of the force generation apparatuses being capable of generating an adjustable force between the vehicle body and each wheel of the vehicle;
a force adjustment unit configured to adjust the force of each of the force generation apparatuses;
a pitch rate detection unit configured to detect a pitch rate due to a shake of the vehicle body in a pitch direction; and
a target pitch state calculation unit configured to calculate a target pitch state from a state in which the vehicle turns, by taking a pitch rate from the pitch rate detection unit or an estimated pitch rate calculated based on the target longitudinal acceleration into account,
wherein the force adjustment unit adjusts the force of each of the force generation apparatuses so that a pitch state of the vehicle body approaches the target pitch state calculated by the target pitch state calculation unit.

2. The vehicle motion control apparatus according to claim 1, further comprising a target pitch state value switching unit capable of switching a value of the target pitch state.

3. The vehicle motion control apparatus according to claim 1, further comprising a target roll state calculation unit configured to calculate a target roll state from the state in which the vehicle turns,
wherein the force adjustment unit further adjusts the force of each of the force generation apparatuses so that a roll state of the vehicle body approaches the target roll state.

4. The vehicle motion control apparatus according to claim 3, wherein the vehicle motion control apparatus changes a control ratio between control with respect to the target pitch state and control with respect to the target roll state according to a state in which a tire of the vehicle grips a road surface.

5. The vehicle motion control apparatus according to claim 4, the vehicle motion control apparatus determines the state in which the tire of the vehicle grips the road surface with use of a difference yaw rate, which is a difference between a detected value and an estimated value of a yaw rate of the vehicle.

6. The vehicle motion control apparatus according to claim 1, wherein the target longitudinal acceleration is calculated according to a lateral jerk due to the steering operation of the vehicle.

7. A vehicle motion control apparatus configured to be used with a vehicle including a brake apparatus capable of generating a brake force at the vehicle when the vehicle turns, to change a posture of a vehicle body in a pitch direction, the vehicle motion control apparatus comprising:
a brake control apparatus configured to control the brake apparatus so as to generate a predetermined brake force based on a target longitudinal acceleration calculated according to a state in which the vehicle turns; and
a plurality of force generation apparatuses disposed between the vehicle body of the vehicle and a plurality of axles, each of the force generation apparatuses being capable of generating an adjustable force between the vehicle body and each wheel of the vehicle,
wherein the vehicle motion control apparatus calculates a target pitch state by taking an estimated pitch rate based on the target longitudinal acceleration into account, and adjusts the force generated by the force generation apparatuses so that a pitch state of the vehicle body approaches the target pitch state.

8. The vehicle motion control apparatus according to claim 7, wherein the vehicle motion control apparatus further calculates a target roll state, and adjusts the force generated by each of the force generation apparatuses so that a roll state of the vehicle body approaches the target roll state.

9. The vehicle motion control apparatus according to claim 8, wherein the vehicle motion control apparatus changes a control ratio between control with respect to the target pitch state and control with respect to the target roll state according to a state in which a tire of the vehicle grips a road surface.

10. The vehicle motion control apparatus according to claim 9, the vehicle motion control apparatus determines the state in which the tire of the vehicle grips the road surface with use of a difference yaw rate, which is a difference between a detected value and an estimated value of a yaw rate of the vehicle.

11. A suspension control apparatus configured to be used with a vehicle including a brake apparatus capable of generating a brake force based on a target longitudinal acceleration according to a state in which the vehicle turns, at the vehicle when the vehicle turns, to change a posture of a vehicle body in a pitch direction, the suspension control apparatus comprising:
a plurality of force generation apparatuses disposed between the vehicle body of the vehicle and a plurality of axles, each of the force generation apparatuses being capable of generating an adjustable force between the vehicle body and each wheel of the vehicle,
wherein the suspension control apparatus calculates a target pitch state by taking an estimated pitch rate based on the target longitudinal pitch acceleration into account, and adjusts the force generated by each of the force generation apparatuses so that a pitch state of the vehicle body approaches the target pitch state, when the brake apparatus changes the posture in the pitch direction while the vehicle is turning.

12. The suspension control apparatus according to claim 11, wherein the suspension control apparatus further calculates a target roll state, and adjusts the force generated by each of the force generation apparatuses so that a roll state of the vehicle body approaches the target roll state.

13. The suspension control apparatus according to claim 12, wherein the suspension control apparatus changes a control ratio between control with respect to the target pitch state and control with respect to the target roll state according to a state in which a tire of the vehicle grips a road surface.

14. The suspension control apparatus according to claim 13, the suspension control apparatus determines the state in which the tire of the vehicle grips the road surface with use of a difference yaw rate, which is a difference between a detected value and an estimated value of a yaw rate of the vehicle.

15. A vehicle motion control apparatus configured to be used with a vehicle including a brake apparatus capable of generating a brake force during a steering operation of the vehicle, the vehicle motion control apparatus comprising:
 a brake control apparatus configured to control the brake apparatus so as to generate a predetermined brake force based on a target longitudinal acceleration calculated according to a steering operation of the vehicle;
 a plurality of force generation apparatuses disposed between a vehicle body of the vehicle and a plurality of axles, each of the force generation apparatuses being capable of generating an adjustable force between the vehicle body and each wheel of the vehicle;
 a force adjustment unit configured to adjust the force of each of the force generation apparatuses;
 a pitch rate detection unit configured to detect a pitch rate due to a shake of the vehicle body in a pitch direction;
 a target pitch state calculation unit configured to calculate a target pitch state from a state in which the vehicle turns, by taking a pitch rate from the pitch rate detection unit or an estimated pitch rate calculated based on the target longitudinal acceleration into account; and
 a target roll state calculation unit configured to calculate a target roll state from the state in which the vehicle turns,
 wherein the force adjustment unit adjusts the force of each of the force generation apparatuses so that a pitch state of the vehicle body approaches the target pitch state while adjusting the force of each of the force generation apparatuses so that a roll state of the vehicle body approaches the target roll state, and
 wherein the vehicle motion control apparatus changes a control ratio between control with respect to the target pitch state and control with respect to the target roll state according to a state in which a tire of the vehicle grips a road surface.

16. A vehicle motion control apparatus configured to be used with a vehicle including a brake apparatus capable of generating a brake force at the vehicle when the vehicle turns to change a posture of a vehicle body in a pitch direction, the vehicle motion control apparatus comprising:
 a brake control apparatus configured to control the brake apparatus so as to generate a predetermined brake force based on a target longitudinal acceleration calculated according to a state in which the vehicle turns; and
 a plurality of force generation apparatuses disposed between the vehicle body of the vehicle and a plurality of axles, each of the force generation apparatuses being capable of generating an adjustable force between the vehicle body and each wheel of the vehicle,
 wherein the vehicle motion control apparatus calculates a target pitch state by taking an estimated pitch rate based on the target longitudinal acceleration into account, and adjusts the brake force generated by the brake apparatus and the force generated by the force generation apparatuses so that a pitch state of the vehicle body approaches the target pitch state, while calculating a target roll state, and adjusting the force generated by each of the force generation apparatuses so that a roll state of the vehicle body approaches the target roll state, and
 wherein the vehicle motion control apparatus changes a control ratio between control with respect to the target pitch state and control with respect to the target roll state according to a state in which a tire of the vehicle grips a road surface.

17. A suspension control apparatus configured to be used with a vehicle including a brake apparatus capable of generating a brake force at the vehicle based on a target longitudinal acceleration according to a state in which the vehicle turns, when the vehicle turns to change a posture of a vehicle body in a pitch direction, the suspension control apparatus comprising:
 a plurality of force generation apparatuses disposed between the vehicle body and a plurality of axles, each of the force generation apparatuses being capable of generating an adjustable force between the vehicle body and each wheel of the vehicle,
 wherein the suspension control apparatus calculates a target pitch state by taking an estimated pitch rate calculated based on the target longitudinal acceleration into account, and adjusts the force generated by each of the force generation apparatuses so that a pitch state of the vehicle body approaches the target pitch state while calculating a target roll state and adjusting the force generated by each of the force generation apparatus so that a roll state of the vehicle body approaches the target roll state, when the brake apparatus changes the posture in the pitch direction while the vehicle is turning, and
 wherein the suspension control apparatus changes a control ratio between control with respect to the target pitch state and control with respect to the target roll state according to a state in which a tire of the vehicle grips a road surface.

18. The vehicle motion control apparatus according to claim 1, wherein the target pitch state calculation unit calculates the target pitch state by taking a larger value of a pitch rate from the pitch rate detection unit and an estimated pitch rate based on the target longitudinal acceleration into account.

19. The vehicle motion control apparatus according to claim 7, wherein:
 the vehicle motion control apparatus has a pitch rate detection unit configured to detect a pitch rate due to a shake of the vehicle body in a pitch direction; and
 the vehicle motion control apparatus is configured to calculate the target pitch state by taking a larger value of a pitch rate from the pitch rate detection unit and an estimated pitch rate based on the target longitudinal acceleration into account, and adjusting a brake force of the brake apparatus and a force generated by the force generation apparatus so that the pitch state of the vehicle body approaches the target pitch state.

20. The suspension control apparatus according to claim 11, wherein:
 the suspension control apparatus receives a signal of a pitch rate of the vehicle body in the pitch direction from the pitch rate detection unit; and
 the suspension control apparatus calculates the target pitch state by taking a larger value of a pitch rate from the pitch rate detection unit and an estimated pitch rate based on the target longitudinal acceleration into account.

* * * * *